United States Patent
Uegaki et al.

(10) Patent No.: US 7,473,300 B2
(45) Date of Patent: Jan. 6, 2009

(54) MOISTURE ABSORBENT COMPOSITION, MOISTURE ABSORBENT MOLDING, AND METHOD FOR CONTROLLING EQUILIBRIUM HUMIDITY, METHOD FOR CONTROLLING TIME OF MAINTAINING EQUILIBRIUM HUMIDITY

(75) Inventors: Katsuhiko Uegaki, Kyoto (JP); Toru Sakiyama, Naruto (JP)

(73) Assignees: Sasaki Chemicals Co., Ltd., Kyoto (JP); Tomita Pharmaceutical Co., Ltd., Tokushima (JP)

( * ) Notice: Subject to any disclaimer, the term of this patent is extended or adjusted under 35 U.S.C. 154(b) by 191 days.

(21) Appl. No.: 11/564,255

(22) Filed: Nov. 28, 2006

(65) Prior Publication Data

US 2008/0058205 A1  Mar. 6, 2008

(30) Foreign Application Priority Data

Aug. 30, 2006  (JP) .............................. 2006-234507

(51) Int. Cl.
*B01D 53/14* (2006.01)
*C08K 3/30* (2006.01)

(52) U.S. Cl. ............................. 95/117; 96/153; 252/194

(58) Field of Classification Search .................... 96/108, 96/118, 153; 95/117; 252/184, 194; 502/400; 524/423

See application file for complete search history.

(56) References Cited

U.S. PATENT DOCUMENTS

| 5,078,909 | A | 1/1992 | Shigeta et al. |
| 6,214,255 | B1 * | 4/2001 | Hekal .......................... 252/194 |
| 6,673,436 | B2 * | 1/2004 | Kawaguchi et al. ......... 428/330 |
| 7,201,959 | B2 * | 4/2007 | Judek et al. ................. 428/323 |
| 7,335,422 | B2 * | 2/2008 | Dick et al. .................. 428/500 |

FOREIGN PATENT DOCUMENTS

| JP | 5-39379 A | 2/1993 |
| JP | 7-53222 B2 | 6/1995 |
| JP | 7-96092 B2 | 10/1995 |
| JP | 8-217913 A | 8/1996 |
| JP | 2002-206046 A | 7/2002 |

* cited by examiner

*Primary Examiner*—Frank M Lawrence
(74) *Attorney, Agent, or Firm*—Birch, Stewart, Kolasch & Birch, LLP

(57) ABSTRACT

A moisture absorbent composition is provided with a thermoplastic resin; and a moisture absorbent kneaded into the thermoplastic resin, having a secondary particle size of substantially 1 to 40 μm, wherein equilibrium humidity is controlled by selecting the specific gravity of the thermoplastic resin. A method for controlling equilibrium humidity in a moisture absorbent composition obtained by kneading a moisture absorbent into a thermoplastic resin is provided, which includes kneading the moisture absorbent such that a secondary particle size of the moisture absorbent is substantially 1 to 40 μm; and controlling equilibrium humidity by selecting specific gravity of the thermoplastic resin.

6 Claims, 18 Drawing Sheets

MOISTURE ABSORBENT COMPOSITION, MOISTURE ABSORBENT MOLDING, AND METHOD FOR CONTROLLING EQUILIBRIUM HUMIDITY, METHOD FOR CONTROLLING TIME OF MAINTAINING EQUILIBRIUM HUMIDITY

BACKGROUND OF THE INVENTION

1. Field of the Invention

The present invention relates to a moisture absorbent composition and a moisture absorbent molding, and in particular to a moisture absorbent composition and a moisture absorbent molding having a humidity conditioning function capable of holding humidity constant. The present invention further relates to a method for controlling the equilibrium humidity, and a method for controlling the equilibrium humidity maintaining time.

2. Description of Related Art

Moisture absorbents, such as silica gel, calcium chloride, quicklime, and zeolite, are used conventionally for preventing the quality deterioration of products due to oxidation or the like caused by moisture absorption in all fields of foodstuffs, pharmaceuticals, electronic components, precision machines, or the like. These moisture absorbents are wrapped with paper, nonwoven fabric, or the like or placed in a container in a granular or powdered state, and enclosed in packaging or the like with products.

On the other hand, for example, Patent document 1 (JP 07-53222B) and Patent document 2 (JP 07-96092B) propose to provide moisture absorbent compositions and moisture absorbent moldings in which specific moisture absorbents (for example, magnesium sulfate) are kneaded into thermoplastic resins to exhibit high moisture absorbency and water-holding capacity without bringing such drawbacks as scattering, moisture absorbency, and liquid leakage due to deliquescence.

Meanwhile, the development of various products is progressing according to diversification of needs for products, the advancement of manufacturing technologies, or the like, in recent years, and accordingly, there is a tendency to diversify the environment of product storage or the like. For example, cereals produce cracks or the like when moisture content is too low, and when moisture content is excessive, on the contrary, an enzymatic reaction progresses to cause deterioration in quality. Therefore, an environment capable of storing the cereals in an equilibrium humidity zone (approximately RH 50%) can be said to be a desirable storage environment. Further, products such as tea leaves, in which water is evaporated to some extent, deteriorate in quality through the enzymatic reaction or oxidation when moisture content increases due to moisture absorption. Therefore, an environment capable of storing the products in an equilibrium humidity zone (approximately RH 20%) is a desirable storage environment.

However, the moisture absorbents, such as silica gel, calcium chloride, quicklime and zeolite, which have been conventionally used as moisture absorbents, have strong desiccative capability and moisture absorbency according to the physical and chemical properties. When these moisture absorbents are put in sealed vessels, bags, and the like, the moisture absorbents absorbs internal moisture in a short period of time, and continue taking up the moisture infinitely until humidity reaches 0%. Thus, the conventional moisture absorbents did not have a humidity control function, and had a problem of incapability of responding to the storage of increasingly diversified products.

On the other hand, for example, Patent document 3 (JP 05-39379A) proposes a humidity conditioning composition and a humidity conditioning molding to which a humidity conditioning function is imparted by kneading a specific moisture absorbent (magnesium sulfate) into a thermoplastic resin.

In the case where magnesium sulfate is kneaded into a thermoplastic resin as a specific moisture absorbent, the composite of the resin and the magnesium sulfate brings about constant vapor pressure. However, the above Patent document 3 focuses on a fact that the vapor pressure in this case is affected by a kneaded resin and shows a value different from a case of the magnesium sulfate single body. Thus, constant humidity to be held was controlled suitably by changing a kind of resin.

That is, the description of the above Patent document 3 is based on an idea of obtaining the composition and the molding having different equilibrium humidity by changing the kind of resin by utilizing the fact that moisture permeability changes depending on the kind of resin. Therefore, the above Patent document 3 did not take the specific gravity of the resin itself into consideration in any way. This is probably based on the following reasons.

Generally, the amount of gas permeation is determined by the following formula: (amount of gas permeation)=(gas permeation coefficient)×(gas pressure difference)×(area)×(time)÷(film thickness). A gas permeation rate (moisture permeability) is obtained by measurement made by fixing the pressure difference, the area, the time, and the film thickness in this formula. The gas permeation rate is a value which changes depending on a gas permeation coefficient, and generally the gas permeation coefficient is determined by the following formula: (gas permeation coefficient)=(diffusion coefficient)×(solubility coefficient). Therefore, when comparison is made by using identical film thickness, the same area, the same time, and the partial pressure difference of the same gas, the amount of gas which moves through a resin film (amount of gas permeation) is decided by the product of the easiness of incorporation of the gas into the film (solubility coefficient), and the easiness of movement of the gas within the film (diffusion coefficient).

If the kind of gas is decided, the solubility coefficient will not change greatly even when a kind of resin (polymer) changes, but changes drastically according to gases for a predetermined polymeric membrane.

The diffusion coefficient changes drastically according to the kind of resin (polymer) forming the polymeric membrane for the same gas, and has no quantitative relationship with the kind of gas, that is, a molecular size and a molecular weight, in a polymeric membrane of the same kind.

Further, resins having a hydroxyl (—OH) or an amide (—CONH—) in the resins are sensitive to water vapor, although polymers are combined firmly together by hydrogen bonds.

When water enters such resins, the hydrogen bonds are destroyed and lost, and as a result, the intermolecular force of the resins is extremely weakened. That is, resin chains are plasticized by the water, gas permeability is increased, and the movement of the resin chains is also activated. Therefore, the gas easily diffuses. Table 1 shows how the gas permeability is increased, when polymers sensitive to the water absorb the water (an extract from "Food Packaging Handbook" published by the Japan Packaging Institute). On the other hand, polymers having a hydrophobic structure (polyethylene and polypropylene) and polymers having low polarity (PVC, PVCD and PET), polymers having a low gas permeation properties due to dipole interactions (PAN), or the like have a smaller amount of water absorption, and gas permeability does not change even when the polymers contain water.

TABLE 1

| Resins | Conditions | $O_2$ permeation rate at 25° C.(Note 1) |
|---|---|---|
| Polyvinyl alcohol | Dry | 0.06 |
| Polyvinyl alcohol | RH 95% | 310 |
| Cellophane (uncoated product) | Dry | 2 |
|  | RH 100% | 3,110 |
| Nylon 6 | Dry | 18 |
| Nylon 6 | RH 100% | 78 |
| Eval F(Note 2) | Dry | 0.26 |
| Eval F | RH 100% | 31 |
| PE | Dry | 7,510 |
| PE | RH 100% | 7,510 |
| Polyacrylonitrile | Dry | 1.6 |
| Polyacrylonitrile | RH 100% | 1.7 |

(Note 1)$O_2$ permeation rate: cc · 25.4 μ/m$^2$ · 24 hr/atm
(Note 2)Eval F is a copolymer of ethylene and vinyl alcohol, wherein vinyl alcohol content is approximately 70%.

Table 2 shows $O_2$ and $H_2O$ permeation rate of resins generally used currently (an extract from "Food Packaging Handbook" published by the Japan Packaging Institute).

As clearly shown in the table, there is no relationship between the $O_2$ permeation rate and the $H_2O$ permeation rate which is generalized in any way.

In the case of gas permeation rate, diffusion is a control factor, and in the case of water vapor permeation rate, the affinity between the water and the resin is a control factor. That is, hydrophobic resins always have small water vapor permeation rates, and hydrophilic resins always have large water vapor permeation rates.

TABLE 2

| | Permeation rate at 25° C.(Note 1) | |
|---|---|---|
| Polymers | $O_2$ | $H_2O$ |
| Polyvinyl alcohol (dry) | 0.065 | |
| Polyvinyl alcohol (wet) | 310 | 1,097 (RH 95%) |
| Eval (dry) | 0.3 | |
| Eval (wet) | 31 | 38 |
| Polyacrylonitrile (crystallized) | 0.65 | 5.5 |
| PVDC (homopolymer) | 1.6 | 0.07 |
| PVDC (copolymer) | 4 | 0.5 |
| Cellophane (dry) | 2 | |
| Polyacrylonitrile copolymer (70% AN) | 16 | 19 |
| Nylon 6 (dry) | 18 | |
| Nylon 6 (wet) | 78 | 47 |
| PET (biaxially-stretched film) | 47 | 5 |
| PET (biaxially-oriented bottle) | 78 | 8 |
| Polychloro trifluoroethylene | 47 | 1.6 |
| Nylon 6-10 (dry) | 93 | |
| Nylon 6-10 (wet) | 155 | 22 |
| PVC (hard) | 124 | 5.5 |
| PVC (for bottles) | 168 | 7 |
| Polyacetal | 155 | 47 |
| Polymethylmethacrylate | 260 | 41 |
| PET copolymer (PRTG) | 414 | 26 |
| Polyvinyl acetate (dry) | 910 | |
| SAN (AN: 25%; ST: 75%) | 1,010 | 44 |
| ABS | 1,550 | 33 |
| High-density PE(d = 0.955) | 1,710 | 0.5 |
| PP | 2,330 | 1.6 |
| Polystyrene | 6,730 | 30 |
| Low-density polyethylene (d = 0.92) | 7,510 | 2.7 |
| Teflon | 7,770 | 1.2 |
| Polybutadiene | 38,840 | 58 |
| Poly-4-methylpentene-1 | 62,140 | 47 |
| Silicone elastomer | 1,398,060 | 823 |

(Note 1)$O_2$: cc · 25.4 μ/m$^2$ · 24 hr · atm, RH 65% $H_2O$: g/m$^2$ · 24 hr · atm As described above, the gas permeation rate, especially the water vapor permeation rate, is a value which changes according to the kinds of gases and resins. Thus it is understood that the value is totally unrelated to the difference in specific gravity of the resins. For this reason, when conventionally obtaining compositions and moldings having different equilibrium humidity, the specific gravity of the resins was probably not taken into consideration.

Further, technical information of a resin manufacturer (Sumitomo Chemical Co., Ltd., "Moisture vapor permeation rate of polyethylene film", PE technical information III-41̂) teaches, as shown in FIG. 18, for example, (sample: LDPE 60 μ-single layer film; measurement conditions: 40° C., RH 90%), that it may be roughly guessed that, when a difference in specific gravity within the same resin is considered, a resin having larger specific gravity has smaller moisture permeation rate. However, in the conventionally common technical knowledge, it was considered that "it is not necessary to take the specific gravity into consideration since the difference in moisture permeation rate due to the difference in the specific gravity is very small", and there is no definite relational expression for the specific gravity difference in the same resin, and no major difference arises from the specific gravity difference, and accordingly, the specific gravity of the resins was hardly considered.

Under such circumstances, only one equilibrium humidity could be set for one kind of resin in the conventional art, and it was necessary to change the kind of resin for changing constant humidity (equilibrium humidity) to be maintained.

However, manufactured articles acquired different gas barrier properties, physical properties, or the like as a result of changing the kind of resin, and, in many cases, it was difficult to secure an aesthetic property required for products to be stored, or too complicated processing methods adversely affect cost and techniques, which causes a problem of difficulty to form a suitable storage environment for increasingly diversified products.

BRIEF SUMMARY OF THE INVENTION

The present invention is made in view of the above-mentioned problems, and an objective thereof is to provide an art for imparting different equilibrium humidity to a moisture absorbent composition and a moisture absorbent molding obtained by kneading a moisture absorbent into a thermoplastic resin, by selecting a resin having different specific gravity from resins of the same kind, and making possible easy formation of a suitable storage environment for increasingly diversified products.

In order to solve the above problems, according to a first aspect of the present invention, a moisture absorbent composition includes a thermoplastic resin; and a moisture absorbent kneaded into the thermoplastic resin, having a secondary particle size of substantially 1 to 40 μm, wherein equilibrium humidity is controlled by selecting specific gravity of the thermoplastic resin.

According to a second aspect of the present invention, a ratio of the secondary particle size to a thickness of the thermoplastic resin is substantially 0.0003 to 4.

According to a third aspect of the present invention, the moisture absorbent is magnesium sulfate represented by formula $MgSO_4 \cdot nH_2O$ ($0 \leq n \leq 3$).

According to a fourth aspect of the present invention, the moisture absorbent is anhydrous magnesium sulfate.

According to a fifth aspect of the present invention, a moisture absorbent molding includes the moisture absorbent composition.

According to a sixth aspect of the present invention, a method for controlling equilibrium humidity includes kneading a moisture absorbent into a thermoplastic resin such that a secondary particle size of the moisture absorbent is substantially 1 to 40 μm; and controlling equilibrium humidity by selecting specific gravity of the thermoplastic resin.

According to a seventh aspect of the present invention, a method for controlling time of maintaining equilibrium humidity includes kneading a moisture absorbent into a thermoplastic resin such that a secondary particle size of the moisture absorbent is substantially 1 to 40 μm; and controlling time of maintaining equilibrium humidity by changing content of the moisture absorbent.

According to the present invention, in the moisture absorbent composition obtained by kneading the moisture absorbent into the thermoplastic resin, the moisture absorbent is kneaded such that the secondary particle size of dispersed moisture absorbent is 1 to 40 μm, and the equilibrium humidity is controlled by selecting the specific gravity of the thermoplastic resin. Therefore, different equilibrium humidity can be easily imparted to even a resin of the same kind. Consequently, when providing equilibrium humidity suitable for products to be stored, it is not necessary to change a kind of resin, or to investigate a new processing method corresponding to the change, removal of adverse effects, and the like, and it becomes possible to easily form an optimum storage environment for the products to be stored.

Additional objects and advantages of the present invention will be apparent from the following detailed description of preferred embodiments thereof, which are best understood with reference to the accompanying drawings.

DETAILED DESCRIPTION OF THE INVENTION

Figure 1:
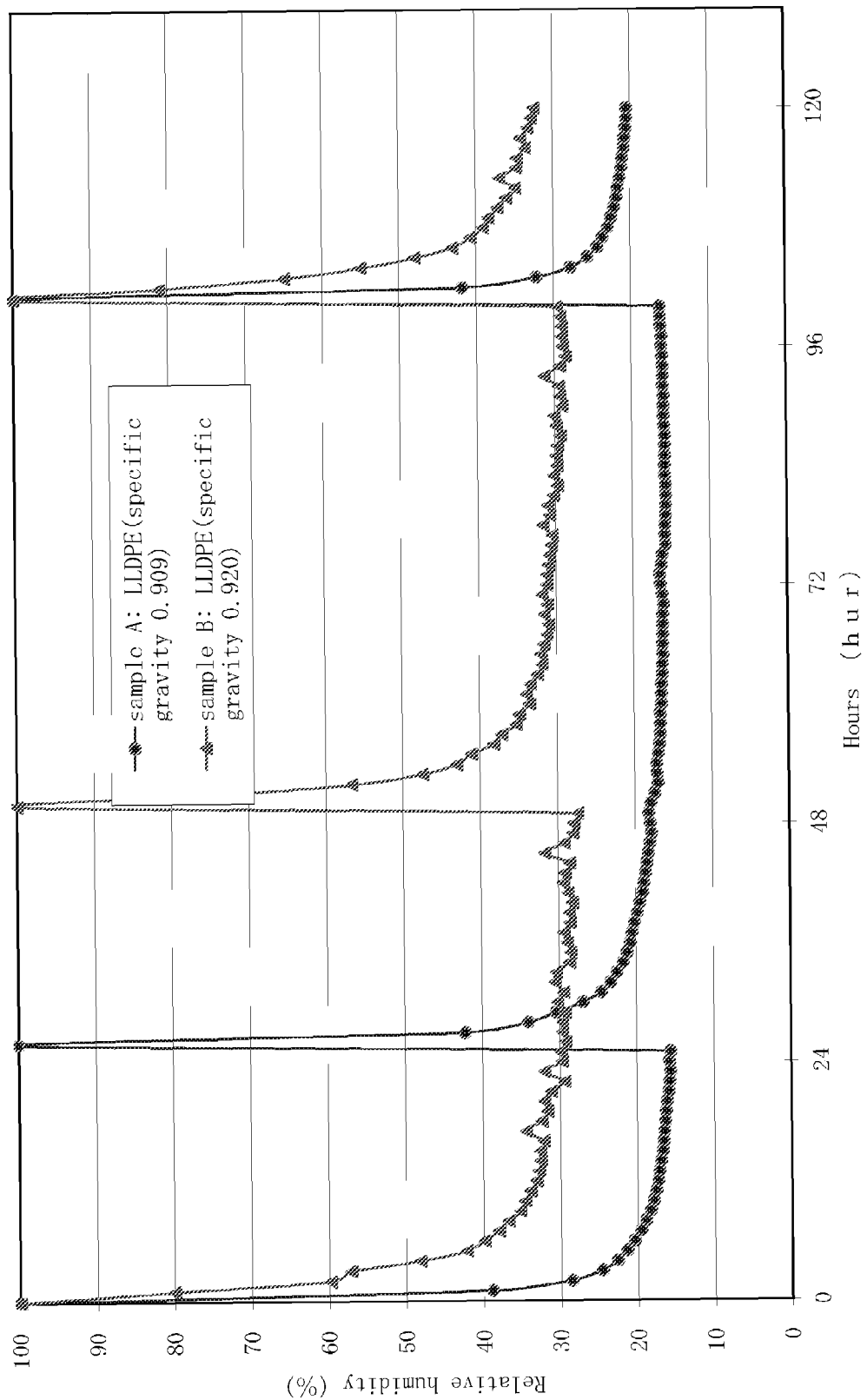
FIG. 1 shows the measurement results of equilibrium humidity according to Example 1.

The present invention is configured to control equilibrium humidity of a moisture absorbent composition obtained by kneading a moisture absorbent into a thermoplastic resin by selecting the specific gravity of the thermoplastic resin. The moisture absorbent composition obtained according to the present invention can be easily processed and molded in arbitrary forms, such as films, sheets, or plates, and further in shapes of bags, pellets, containers, or the like according to use. A molding thus obtained is a moisture absorbent in itself, and moreover, can serve as a packaging material.

The thermoplastic resin is not limited in particular, and publicly known resins can be used, as long as the resin has two or more selectable specific gravity grades. For example, one or two kinds or more of polyethylene, polypropylene, polycarbonate, polyamide, an ethylene-vinylacetate copolymer, an ethylene-methacrylate copolymer, polyvinyl chloride, polystyrene, a polyester, a polyacrylic acid ester, polyvinylidene chloride, ABS, polylactic acid, polyacetal, polyacrylonitrile, a polyimide, polybutylene terephthalate (PBT) can be used.

Although the range of specific gravity to be used changes depending on the basic specific gravity of a thermoplastic resin, the range in general is preferably 0.01 or more, and more preferably 0.02 or more so as to sufficiently differentiate the obtained equilibrium humidity.

From such a viewpoint, for example, LLDPE, LDPE, ABS, PS, PA, or the like can be used suitably, and LLDPE and ABS are particularly preferable. Among currently marked resins, LLDPE is especially suitable, because it has a wide range of specific gravity and many kinds of processible products, and can be further processed by a simpler method.

For example, the range of specific gravity of LLDPE is 0.900 to 0.930, the range of specific gravity of ABS is 1.07 to 1.15, the range of specific gravity of polyamide (6 nylon) is 1.09 to 1.17, the range of specific gravity of polypropylene is 0.90 to 0.92, the range of specific gravity of polystyrene is 1.04 to 1.10, the range of specific gravity of methyl methacrylate resin is 1.17 to 1.20. The range of specific gravity of vinyl chloride resin (hard) is 1.35 to 1.45, the range of specific gravity of vinyl chloride resin (soft) is 1.15 to 1.70, the range of specific gravity of vinylidene chloride resin is 1.7 to 1.8, the range of specific gravity of polyvinyl alcohol is 1.17 to 1.18, the range of specific gravity of cellulose acetate is 1.22 to 1.34, and the range of specific gravity of cellulose nitrate is 1.35 to 1.40. Thus, any resin can be used for the present invention.

One of the important characteristics of the present invention resides in a point that the equilibrium humidity of the moisture absorbent composition is controlled by selecting the specific gravity of the thermoplastic resin.

The expression "selecting specific gravity of the thermoplastic resin" shall mean using a resin by selecting predetermined specific gravity out of two or more specific gravity grades which the thermoplastic resin has.

When a substance (moisture absorbent) having equilibrium vapor pressure is kneaded into a resin, a composition formed of the resin and the moisture absorbent is affected by the resin, and exhibits equilibrium vapor pressure different from that of a moisture absorbent single substance. Partial pressure at which the vapor pressure of the composition formed of the resin and the moisture absorbent and the partial water vapor pressure of the outside environment are equalized shall be called equilibrium vapor pressure, and relative humidity indicated by the partial water vapor pressure at that time shall be called "equilibrium humidity".

The "equilibrium humidity" to be provided to the moisture absorbent composition according to the present invention is based on optimum humidity (relative humidity) for storing objects to be stored, such as goods and products, in a state where the original performance of the objects can be demonstrated, and can be peculiarly set corresponding to the objects to be stored. Such optimum humidity is different according to the objects to be stored, but is RH 10% to RH 60% in general. The above-mentioned "equilibrium humidity" to be provided is preferably in the range of ±10% of the optimum humidity, and more preferably in the range of ±5%. If the equilibrium humidity is within such a range, a storage environment extremely favorable for the objects to be stored can be formed.

"Controlling equilibrium humidity" shall mean to hold the "equilibrium humidity" to "equilibrium humidity" which the moisture absorbent composition ought to have. There is a certain level of width in the optimum humidity for the objects to be stored according to raw material control ranges, seasonal factors during processing, or the like, If the range of the "equilibrium humidity" is controlled to be excessively small, several sorts of compositions (moldings) are required for dealing with one object to be stored, and accordingly, product control, the selection of packaging materials, and the like are complicated too much, which is not preferable.

The moisture absorbent to be kneaded into the thermoplastic resin is preferably an anhydride of a substance which has equilibrium vapor pressure (equilibrium humidity) and absorbs crystal water and, for example, magnesium sulfate, copper sulfate, cobalt chloride, calcium chloride, magnesium chloride, or the like, can be used. In terms of excellent dispersibility into the resin, moisture absorption efficiency, a state in the final stage of moisture absorption (there is no deliquescence or the like), thermal stability, or the like, magnesium sulfate represented by formula $MgSO_4 \cdot nH_2O$ (wherein, $0 \leq n \leq 3$), especially anhydrous magnesium sulfate, is suitable.

When kneaded into the resin, hydrated magnesium sulfate exceeding a trihydrate releases own water of hydration due to heating during kneading, and causes a hindrance in production. A humidity conditioning composition capable of exhibiting an effective function cannot be obtained, and even when trying to manufacture moldings, such as films, sheets, and containers, from this composition, the moldings of a commercial value cannot be obtained. If anhydrous magnesium sulfate is used, in a resin finishing temperature zone (100° C. to 400° C.), the amount of moisture desorption in processing can be reduced, and it is possible to improve the amount of moisture absorption in the moldings, which is especially preferable since thermal stability is high (not decomposed in processing).

In the following, a role played by a moisture absorbent kneaded into a thermoplastic resin in the present invention is described taking a case of the magnesium sulfate as an example in particular.

When the magnesium sulfate used in the present invention begins to absorb moisture under a constant temperature condition, vapor pressure increases as a hydration stage progresses. In connection with this, the difference with the partial pressure of environmental water vapor is reduced, and accordingly, moisture absorption rate falls. As a result, a composition which maintains constant humidity and has a humidity conditioning function can be obtained. Further, when the magnesium sulfate used in the present invention absorbs humidity, a hexahydrate is produced. Then, only the hexahydrate increases with an increase in moisture absorption, and mono- to penta-hydrates are not produced in the meantime. At the time when the amount of anhydrous magnesium sulfate becomes insignificant, that is, water absorption becomes 43 to 48%, the hexahydrate changes to a heptahydrate. According to this fact, an anhydride exists during high moisture absorption unlike moisture absorbents using other hydrate-forming salts, and thus the moisture absorbents of the present invention becomes the composition which holds hygroscopicity constant and has the humidity conditioning function.

Further, the magnesium sulfate used in the present invention exhibits constant vapor pressure in itself, and can absorb moisture until the partial pressure of ambient water vapor and the own vapor pressure are equilibrated. When the above-described magnesium sulfate is kneaded into the resin, a composite of the magnesium sulfate and the resin comes to show constant vapor pressure. Unlike the vapor pressure of the magnesium sulfate alone, the vapor pressure at this time is affected by the moisture permeability of the resin kneaded with the magnesium sulfate, and takes different values depending on resins. Further, in the present invention, it is found out that the vapor pressure concerned can be controlled to different values by selecting a resin having different specific gravity among resins of the same kind. In this case, points resulting in the equilibrium are naturally different, and equilibrium humidity at which it becomes impossible to absorb moisture also differs. Therefore, the constant humidity (equilibrium humidity) to be held is made controllable by suitably selecting the specific gravity of the resin.

The moisture absorbent has preferably a small dimensional change (or no change) before and after moisture absorption. The reason is that when the moisture absorbent is expanded after moisture absorption, the molding itself expands and it becomes impossible to maintain a form as a product.

Further, the moisture absorbent produces agglomerated substances in the air due to factors, such as electrostatic charging, moisture absorption and pressure. However, in the present invention, the secondary particles of the moisture absorbent are maintained in a predetermined size, and dispersed as uniformly as possible in the stage of kneading the moisture absorbent into the resin.

In order to differentiate performance (equilibrium humidity) by using the difference of the degree of the specific gravity range of the resins, more specifically, the secondary particle size of the moisture absorbent when kneaded and dispersed into the resin is preferably set in the range of substantially 1 to 40 μm. In particular, an average particle size is preferably set to about 20 μm and a maximum particle size minus a minimum particle size to about 30 μm. Therefore, the particle size of the primary particles of the moisture absorbent is preferably set in the range of about 1 to 30 μm, and the average particle size to about 4 to 6 μm.

The usable thickness of the thermoplastic resin to be kneaded with the moisture absorbent is usually 10 μm to 3 mm. The ratio of the secondary particle size to the thickness of the thermoplastic resin of the dispersed moisture absorbent is preferably in the range of substantially 0.0003 to 4, and more preferably in the range of substantially 0.0004 to 1. When the ratio concerned is in such a range, and the secondary particle size of the moisture absorbent is in the described range, the thermoplastic resin can sufficiently coat the moisture absorbent, and it becomes possible to acquire the effects of the present invention more reliably.

The moisture absorbents, such as the magnesium sulfate, tend to produce firm agglomerated bodies which are difficult to disperse as discussed previously. Conventionally, however, attention was not paid to the point of arranging secondary particles in a small constant size in the stage of kneading and dispersing the moisture absorbent into the resin. For this reason, even if the particle size of the moisture absorbent was approximately 1 to 40 μm in the stage of the primary particles, agglomeration easily takes place in kneading, and massive bodies of several hundreds of micrometers were produced at a maximum.

Consequently, a composition and a molding in which such agglomerated bodies are dispersed in the resin were obtained. However, under such a dispersion state, there arose many portions in which the coarse secondary particles of the moisture absorbent were protruding without being accommodated in the resin layer in the boundary face of a resin layer into which the moisture absorbent was kneaded.

Also in portions where the secondary particles of the moisture absorbent are accommodated in the resin layer, the size of the particles had excessive differences, and there was a variation in a distance from a resin layer surface to the kneaded moisture absorbent. Therefore the moisture absorption power of the moisture absorbent in the resin varied.

In such a situation, the performance of the moisture absorbent in the resin becomes nonuniform, and it was not a state where a performance difference can be demonstrated by the specific gravity difference of the resin.

The present invention aims at the uniformity of the secondary particle size of the moisture absorbent when the moisture absorbent is kneaded and dispersed into the thermoplastic resin. By suppressing moisture absorption and manufacturing fine primary particles, agglomerated bodies are hardly produced. Even if the agglomerated bodies are produced, the agglomerated bodies are managed in a state of being easily collapsed. Furthermore, by improving the affinity between resin components and the moisture absorbent in the kneading stage, and kneading the moisture absorbent into the resin in a state of being more easily adapted, secondary particles are dispersed by keeping the particle size uniformly in the range of substantially 1 to 40 μm. For this purpose, a substance having high affinity with the resin, such as a surfactant-based dispersant (for example, a metallic salt of fatty acid such as a metallic soap), is preferably used for coating the surface of the moisture absorbent.

By controlling the dispersed secondary particle size of the moisture absorbent to the predetermined size, the thermoplastic resin can fully coat the moisture absorbent and the distance from the resin surface to the moisture absorbent can be substantially uniformized. Thus, only after acquiring such a dispersion state, it becomes possible to differentiate the performance (equilibrium humidity) by utilizing a subtle difference in the specific gravity difference of the resin.

When the secondary particles of the moisture absorbent protrude from the surface of the kneading resin without being coated with the resin, the particles are not affected by the resin, but absorb moisture at equilibrium humidity of the moisture absorbent itself (RH 4% in the case of anhydrous magnesium sulfate). When the proportion of poorly dispersed moisture absorbent increases, the moisture absorbent is less affected by the resin in this way, and depending on the ratio relative to the proportion of the moisture absorbent affected by the resin, equilibrium humidity as the whole composition appears significantly different from equilibrium humidity in a state where the resin is fully coating all the moisture absorbent particles. Further, the performance of the composition does not stay constant, is affected by dispersion conditions or the like for every production, and products having different performance are formed.

In processing of kneading the moisture absorbent into the thermoplastic resin, the moisture absorbent and the resin are made into a fluidized state. Perhaps due to the difference of fluidity in both sides, coarse particles tend to rise from the surface of the resin due to friction with flow channel internal surfaces or the like. According to experimental observation by the present inventors, when the secondary particle size of the moisture absorbent exceeds about 40 μm, this tendency becomes prominent, and it becomes clear that when the secondary particle size is about 30 μm or smaller in particular, all the particles can fully be coated with the resin even if the particles may be dispersed in the vicinity of the resin surface.

In the present invention, the proportion of a raw material to be kneaded is in the range of approximately 5 to 400 parts by weight of moisture absorbents to 100 parts by weight of the thermoplastic resin, and may be suitably changed according to the uses of the composition. When the proportion of the moisture absorbent is in the described range, the dispersibility of the moisture absorbent in the resin is satisfactory, and exhibits high moisture absorbency and a water-holding property. Further, a moisture absorbent composition having excellent molding ability can be obtained.

In addition to the above-mentioned thermoplastic resin and the moisture absorbent, a predetermined foaming agent and additives may be suitably added to the moisture absorbent composition of the present invention as far as the objective of the present invention is not obstructed. As the foaming agent, for example, azoisobutylnitrile, azodicarbonamide, 4,4'-oxybenzene sulfonyl hydrazide, or the like can be used, and as the additive, publicly known additives, such as a plasticizer, a stabilizer, a lubricant, and a coloring agent, can be used.

There is no particular restriction in a method for manufacturing the moisture absorbent composition of the present invention, and the composition can be usually manufactured by the following method. That is, the thermoplastic resin, the moisture absorbent, and other additives are kneaded at 100 to 350° C. for approximately 5 to 40 minutes by using a mixing roll or the like. However, in order to obtain high-dispersion and high-concentration pellets, production is preferably performed by using a processing machine having satisfactory dispersion capability in a pellet stage in particular.

The composition obtained by the above method can be processed and molded into arbitrary forms by extrusion molding, co-extrusion molding, injection molding, hollow molding, extrusion coating molding, cross-linking foaming molding, or the like. The composition can also be formed in a laminated body in which other laminating materials are stacked when necessary. As the laminating material, besides resins such as the above-described thermoplastic resin, paper, fibers, metals, various coating materials, various adhesives, and a moisture absorbent molding of the present invention having a different composition can be used.

EXAMPLE 1

Pellets were test-manufactured by mixing 100 parts by weight of LLDPE (linear low-density polyethylene) (specific gravity 0.909) and 50 parts by weight of anhydrous magnesium sulfate whose average primary particle size is 4 to 6 μm, and heating and kneading the resultant mixture at 180° C. for 10 minutes by using an experimental mixing roll. The secondary particle size of dispersed magnesium sulfate was set to 1 to 40 μm (average 10 to 20 μm).

Using these pellets, a three-layer inflation film having an outer layer of LLDPE, an intermediate layer of the above test-manufactured pellets, and an internal layer of LLDPE (LLDPE 20 μm/test-manufactured pellet 30 μm/LLDPE 10μ) was obtained by using an inflation molding machine.

Next, the above three-layer inflation film was used for dry laminate processing with a polyethylene film and an aluminum foil to obtain a 0.81 mm thick sheet (PET 12 μm/D/AL 9 μm/D/LLDPE 20 μm/test-manufactured pellets 30 μm/LLDPE 10 μm; D is a dry laminate layer) by employing a press roll. Then, this sheet was processed to manufacture a packaging bag of an A4 size (volume 2.4 L) as a sample A.

With 100 parts by weight of LLDPE (linear low-density polyethylene) (specific gravity 0.920), 50 parts by weight of anhydrous magnesium sulfate whose average primary particle size is 4 to 6 μm were mixed, and then, similar to the sample A, pellets were test-manufactured to obtain a three-layer inflation film (LLDPE 20 μm/test-manufactured pellets 30 μm/LLDPE 10 μm). The secondary particle size of the dispersed magnesium sulfate was 1 to 40 μm (average 10 to 20 μm).

Then, similar to the sample A, this three-layer inflation film was used to obtain a sheet laminated with a polyethylene film and an aluminum foil (PET 12 μm/D/AL 9 μm/D/LLDPE 20 μm/test-manufactured pellets 30 μm/LLDPE 10 μm; D is a dry lamination layer). This sheet was processed to manufacture a packaging bag of the same size as the size of the sample A, as a sample B.

In addition, in the sample A and the sample B, the same LLDPE sheets (specific gravity 0.922) were placed on both sides of the test-manufactured pellets.

The above samples A and B were used as test samples, and under a constant temperature condition of 25° C., a temperature and humidity sensor was set in each bag, and then moisture absorption from RH 100% was performed to measure equilibrium humidity. The measurement was performed by returning to a state of RH 100% after reaching the equilibrium humidity, and repeating the moisture absorption.

The results are shown in FIG. 1.

As clearly shown in FIG. 1, the sample A had the equilibrium humidity of 16 to 17%, and the sample B had the equilibrium humidity of 29 to 30%. Thus, even if the content of magnesium sulfate is identical, the moisture absorbent compositions exhibiting different equilibrium humidity could be obtained by selecting LLDPE having different specific gravity as the resin to be kneaded with the magnesium sulfate. In the present embodiment, there was a difference of 13 to 14% in the equilibrium humidity under a difference of 0.011 in the specific gravity of LLDPE, and LLDPE having lower specific gravity maintained the equilibrium at lower humidity.

According to the present example, the equilibrium humidity to be provided can be easily controlled by selecting LLDPE of suitable specific gravity. Therefore, it becomes possible to easily obtain suitable storage environments according to objects to be stored.

For example, packaging bags having the composition of the sample A according to the present example is effectively used for medicines or diagnostic agents using antibodies or enzymes, soft capsules, and the like as objects to be stored, and packaging bags having the composition of the sample B are effectively used for percutaneous absorption medicines, soft capsules (having close equilibrium humidity), and the like as objects to be stored. Conventionally, it was necessary to change kinds of resins to support the formation of such optimum storage environments. However, according to the present example, it becomes possible to control the achievement of equilibrium humidity suitable for objects to be stored only by changing the specific gravity of the resin according to the objects to be stored, which is significantly convenient.

EXAMPLE 2

The three-layer inflation film (LLDPE 20 μm/test-manufactured pellets 30 μm/LLDPE 10 μm) obtained in the middle of production of the sample A in Example 1 was used as a sample C.

The three-layer inflation film (LLDPE 20 μm/test-manufactured pellets 30 μm/LLDPE 10 μm) obtained in the middle of production of the sample B in Example 1 was used as a sample D.

Figure 2:
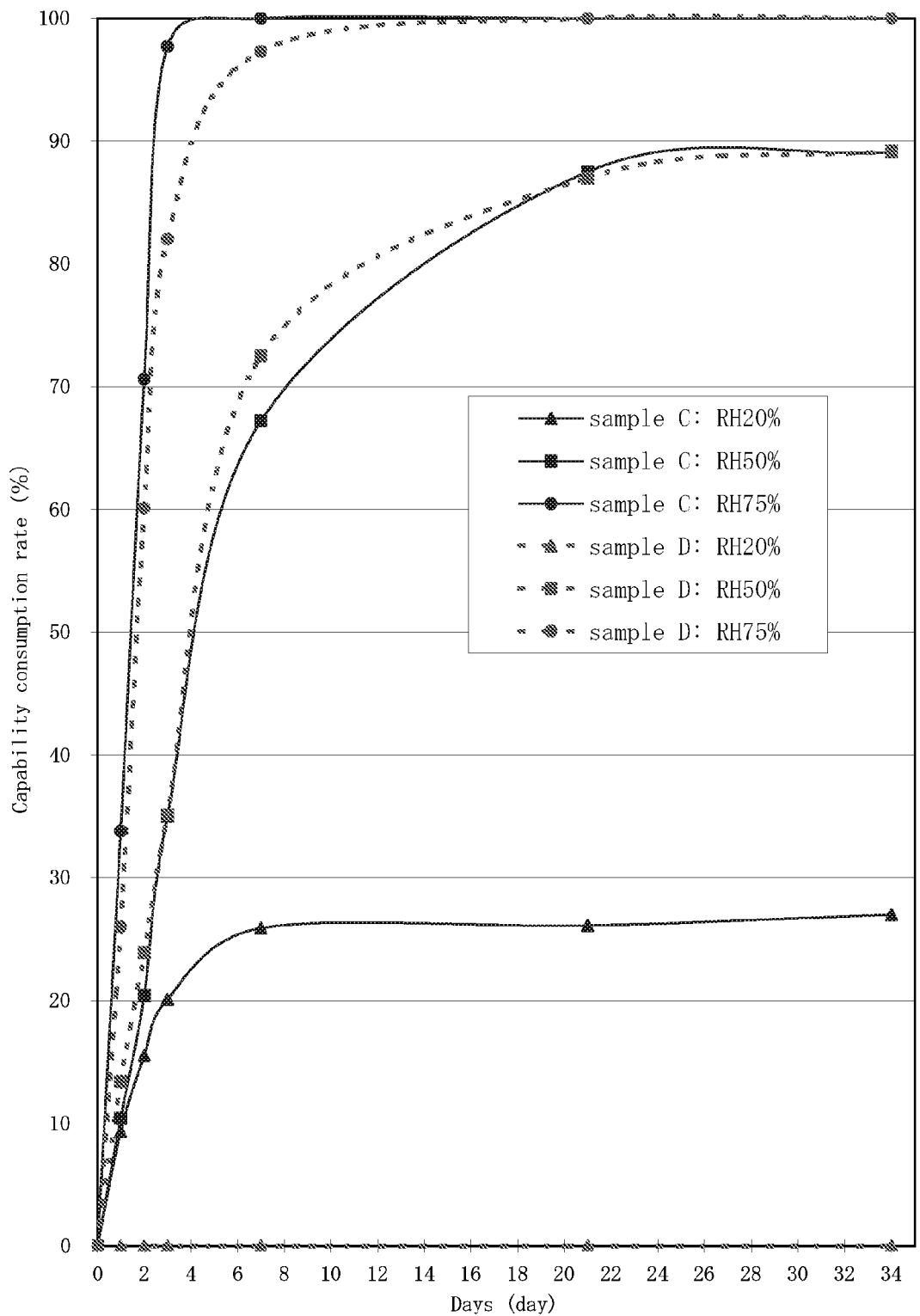
FIG. 2 shows the measurement results of capability consumption rates according to Example 2.

The above samples C and D were used as test samples, and placed, respectively, under three kinds of conditions at constant temperature of 25° C. and constant humidity of RH 20%, 50%, and 75%. Then weight changes were measured. FIG. 2 shows the measurement results expressed in terms of capability consumption rates.

The capability of moisture absorbents are generally expressed in terms of moisture absorption rate (a value obtained by dividing an increased weight by an initial weight and multiplying by 100 (%)) in many cases, but the moisture absorption rate differs according to the content of an absorbent, or the construction of other layers even in a moisture absorption layer of the same thickness. Therefore, in the present embodiment, full capacity provided to the compositions and moldings are considered as 100%, and a capability consumption rate indicating the consumption condition is used to facilitate the comparison.

When the capability consumption state under the condition of RH 20% is observed in FIG. 2, the sample C has a weight change and appears to have capability consumption, but the sample D has no weight change from start to finish and appears to have no consumption of capability. Since the environmental condition of this test is a constant humidity condition, this test shows that the sample capable of absorbing moisture in the environment has equilibrium humidity, which is the moisture absorption limit of the sample, equal to or lower than the environmental condition. On the contrary, the sample incapable of absorbing moisture in the environmental condition has equilibrium humidity, which is the moisture absorption limit of the sample, equal to or higher than the environmental condition.

As a result, the equilibrium humidity of the sample C is lower than RH 20%, and the equilibrium humidity of the sample D is RH 20 to 50%. Therefore, it is understood that the samples C and D exhibit different equilibrium humidity.

The present example also supports that, even if the content of magnesium sulfate is identical, the moisture absorbent compositions exhibiting different equilibrium humidity can be obtained by selecting LLDPE having different specific gravity as the resin to be kneaded with the magnesium sulfate.

EXAMPLE 3

With 100 parts by weight of LDPE (low-density polyethylene) (specific gravity 0.922), 150 parts by weight of anhydrous magnesium sulfate whose average primary particle size is 4 to 6 μm was mixed, and then, similar to Example 1, pellets were test-manufactured to obtain a three-layer inflation film (LDPE 20 μm/test-manufactured pellets 30 μm/LDPE 10 μm). The secondary particle size of the dispersed magnesium sulfate was 1 to 40 μm (average 10 to 20 μm).

Then, similar to Example 1, this three-layer inflation film was used to obtain a sheet laminated with a polyethylene film and an aluminum foil (PET 12 μm/D/AL 9 μm/D/LDPE 20 μm/test-manufactured pellets 30 μm/LDPE 10 μm; D is a dry laminate layer). This sheet was cut in a size of 21 cm×30 cm to obtain a sample E.

With 100 parts by weight of LDPE (specific gravity 0.922), 50 parts by weight of anhydrous magnesium sulfate whose average primary particle size is 4 to 6 μm were mixed, and then, similar to the sample E, pellets were test-manufactured to obtain a three-layer inflation film (LDPE 20 μm/test-manufactured pellets 30 μm/LDPE 10 μm). The secondary particle size of the dispersed magnesium sulfate was 1 to 40 μm (average 10 to 20 μm).

Then, similar to the sample E, this three-layer inflation film was used to obtain a sheet laminated with a polyethylene film and an aluminum foil (PET 12 μm/D/AL 9 μm/D/LDPE 20 μm/test-manufactured pellets 30 μm/LDPE 10 μm; D is a dry laminate layer). This sheet was processed into the same size as the size of sample E to obtain a sample F.

The above samples E and F were used as test samples, and placed in separate glass vessels (volume 0.9 L). Then, under a constant temperature condition of 25° C., a temperature and humidity sensor was set in each vessel, and moisture absorption from RH 100% was performed to measure equilibrium humidity. The measurement was performed by returning to a state of RH 100% after reaching the equilibrium humidity, and repeating the moisture absorption. The results are shown in FIG. 3.

Figure 3:
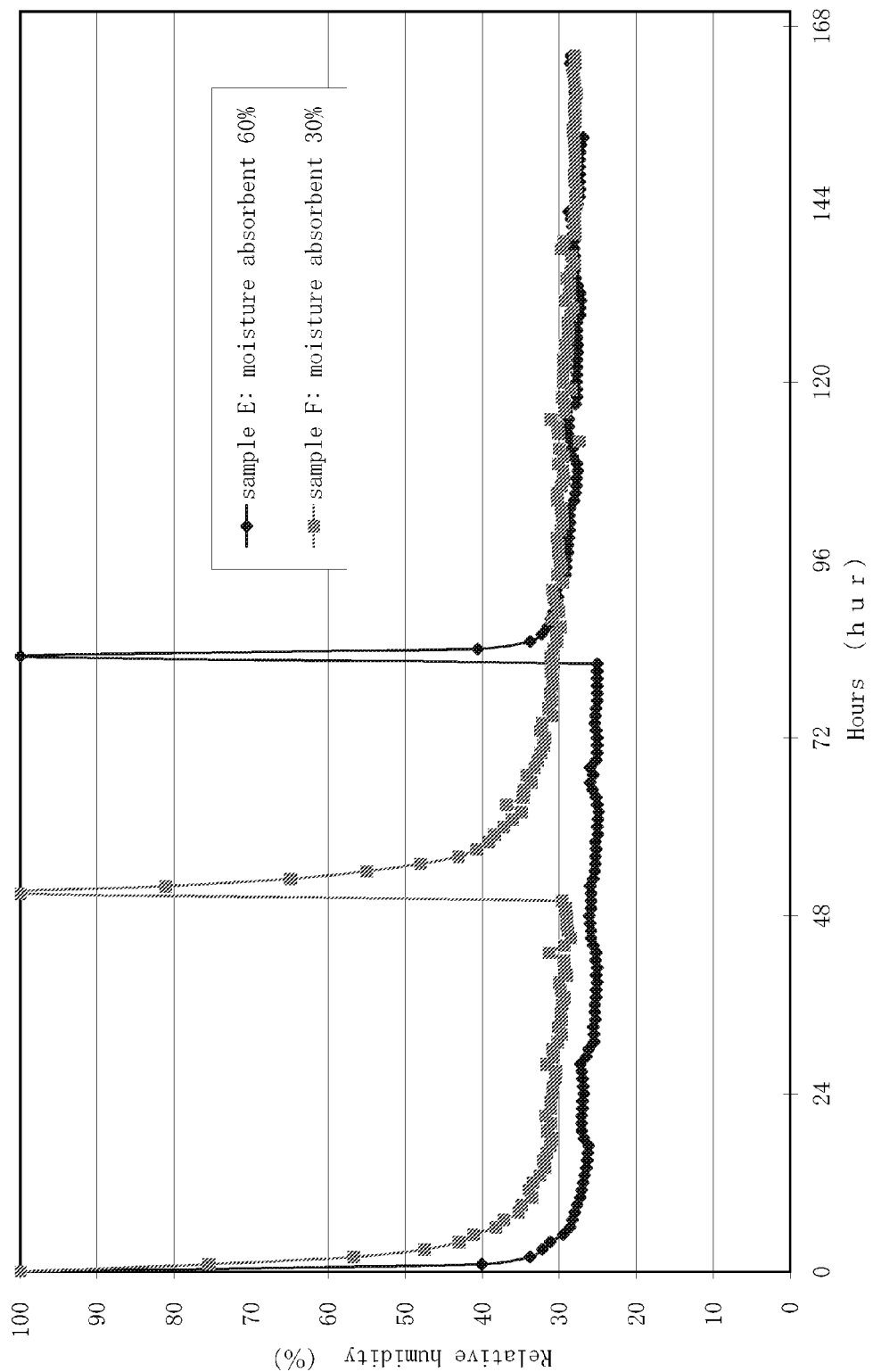
FIG. 3 shows the measurement results of equilibrium humidity according to Example 3.

As clearly shown in FIG. 3, the samples E and F had approximately the same equilibrium humidity of 26 to 29%, respectively.

Thus, even if the content of magnesium sulfate is changed but the specific gravity of resin LDPE to be kneaded with the magnesium sulfate is identical, the moisture absorbent compositions had approximately the same equilibrium humidity.

EXAMPLE 4

The three-layer inflation film (LDPE 20 μm/test-manufactured pellets 30 μm/LDPE 10 μm) obtained in the middle of production of the sample E in Example 3 was used as a sample G.

The three-layer inflation film (LDPE 20 μm/test-manufactured pellets 30 μm/LDPE 10 μm) obtained in the middle of production of the sample F in Example 3 was used as a sample H.

Figure 4:
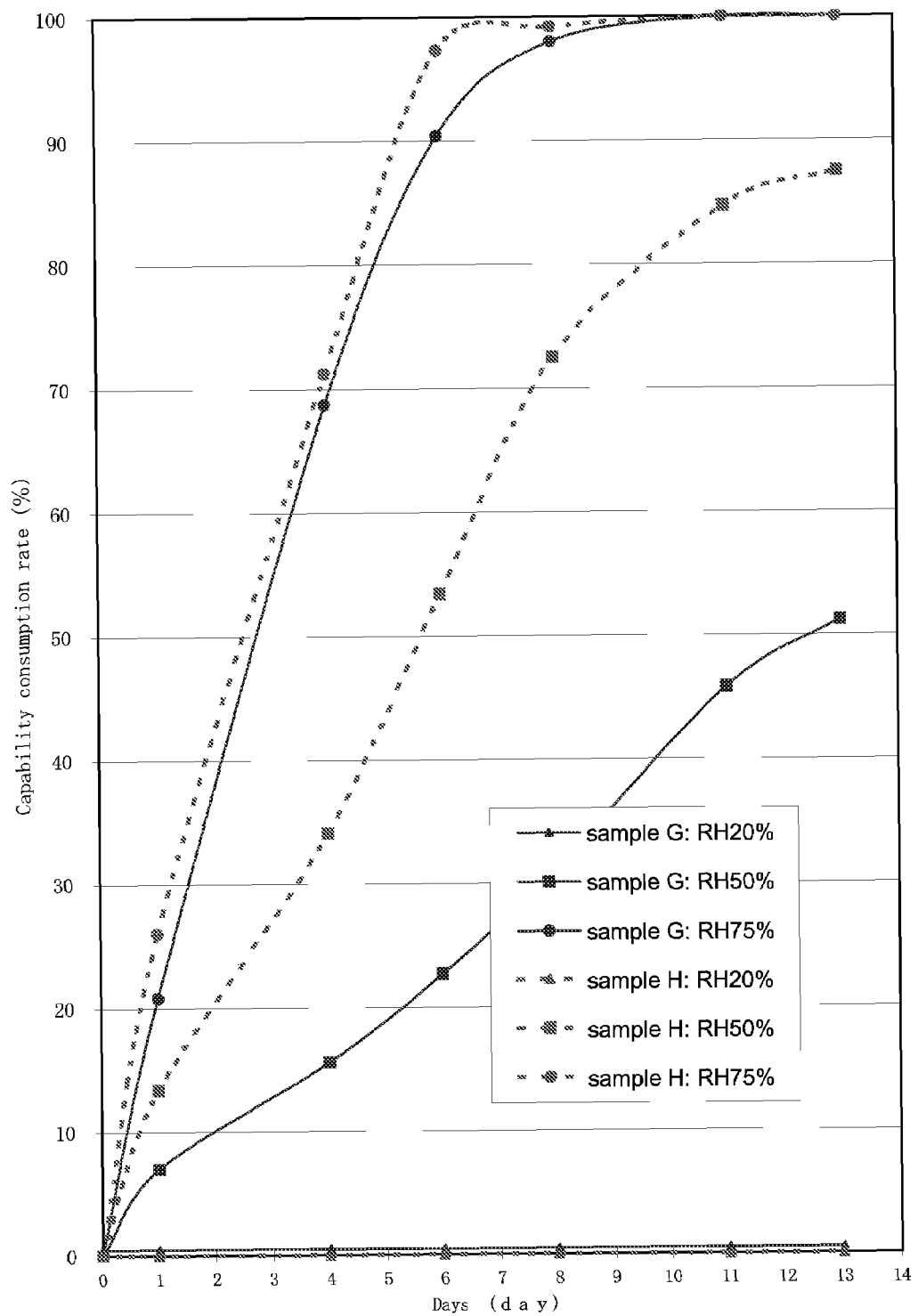
FIG. 4 shows the measurement results of the capability consumption rates according to Example 4.

The above samples G and H were used as test samples and placed, respectively, under three kinds of constant temperature and constant humidity conditions of 25° C., RH 20%, 50%, and 75%, and then weight changes were measured. FIG. 4 shows the measurement results expressed in terms of capability consumption rates.

As clearly shown in FIG. 4, both of the samples G and H do not absorb moisture in the case of environmental moisture of RH 20%, but absorb moisture and consume their capability in the case of environmental moisture of RH 50%. Although the progress time of the capability consumption rate differs, the state of existence or nonexistence of the moisture absorption shows the same behavior, and it turns out that the equilibrium humidity, which is the moisture absorption limit of both samples, is higher than RH 20% and lower than RH 50%.

The present example also supports that, even if the content of magnesium sulfate is changed but the resin LDPE into which the magnesium sulfate is kneaded has the same specific gravity, equilibrium humidity hardly differed.

REFERENCE EXAMPLE

With 100 parts by weight of LDPE (low-density polyethylene) (specific gravity 0.920), 150 parts by weight of anhydrous magnesium sulfate whose average primary particle size is 4 to 6 μm was mixed, and then, similar to Example 1, pellets were test-manufactured to obtain a three-layer inflation film (LDPE 20 μm/test-manufactured pellets 30 μm/LDPE 10 μm). As for the dispersion state of the magnesium sulfate, management for controlling secondary particles to be small was not performed, and 30% coarse secondary particles whose particle sizes are approximately in the range of greater than 40 μm and smaller than about 100 μm were contained.

Next, using the above three-layer inflation film, dry laminate processing with a polyethylene film and an aluminum foil was performed by using a press roll to obtain a 0.81 mm thick sheet (PET 12 μm/D/Al 9 μm/D/LDPE 20 μm/test-manufactured pellets 30 μm/LDPE 10 μm; D is a dry laminate layer). Then, this sheet was processed to manufacture a packaging bag of an A4 size (volume 2.4 L) as a sample P.

Further, the above test-manufactured pellets were used to manufacture a plate (85 mm×54 mm, 1.5 mm thick) as a sample Q by injection molding.

The above sample P was used as a test sample, and under a constant temperature condition of 25° C., a temperature and humidity sensor is set in the bag, and then moisture absorption from RH 100% was performed to measure equilibrium humidity. The measurement was performed by returning to a state of RH 100% after reaching the equilibrium humidity, and repeating the moisture absorption. The results are shown in FIG. 5.

The above sample Q was used as a test sample, and placed in a glass vessel (volume 0.9 L). Then, under a constant temperature condition of 25° C., a temperature and humidity sensor was set in the vessel, and moisture absorption from RH 100% was performed to measure equilibrium humidity. The measurement was performed by returning to a state of RH 100% after reaching the equilibrium humidity, and repeating the moisture absorption. The results are shown in FIG. 6.

Figure 5:
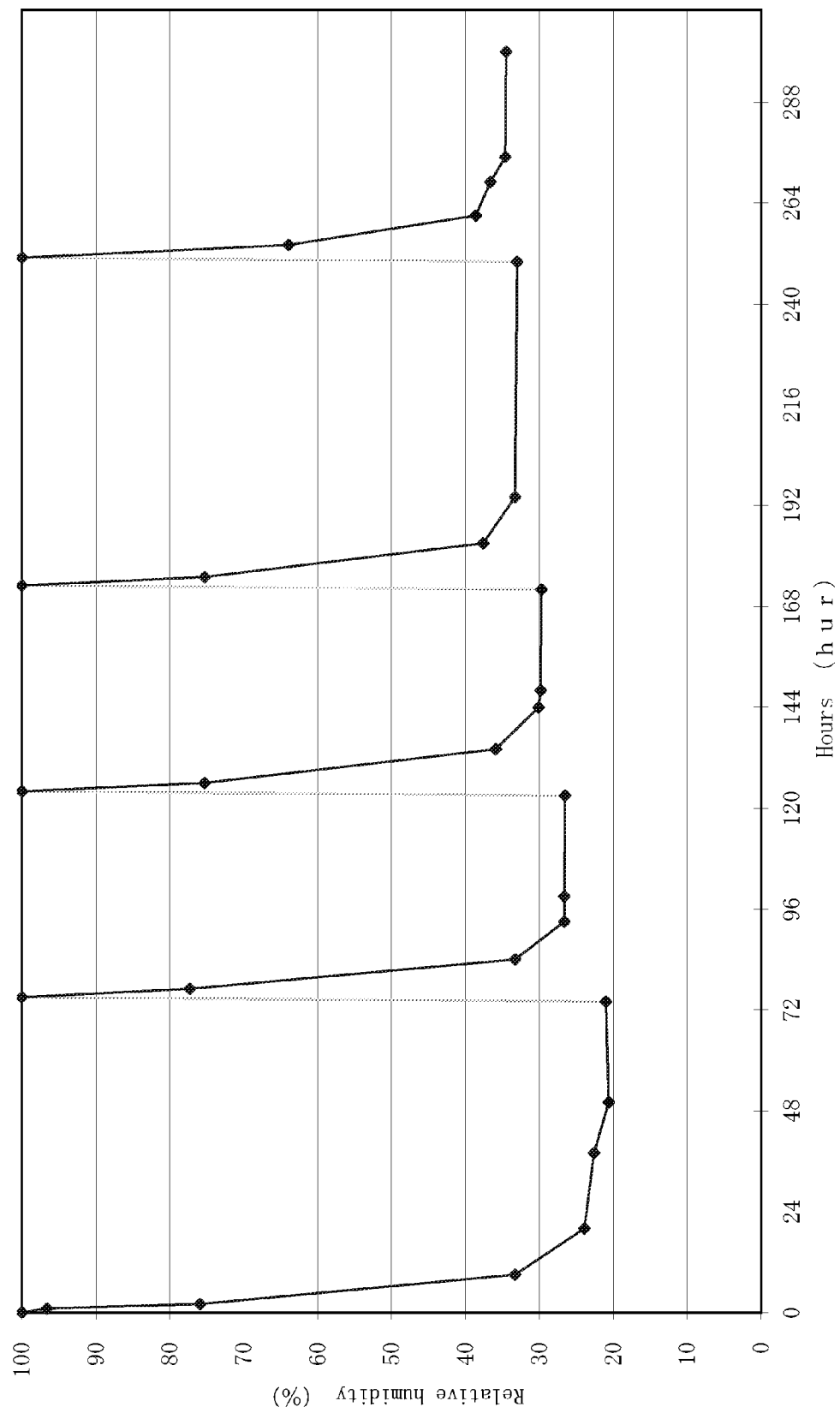
FIG. 5 shows the measurement result of equilibrium humidity according to a Reference example (sample P)
Figure 6:
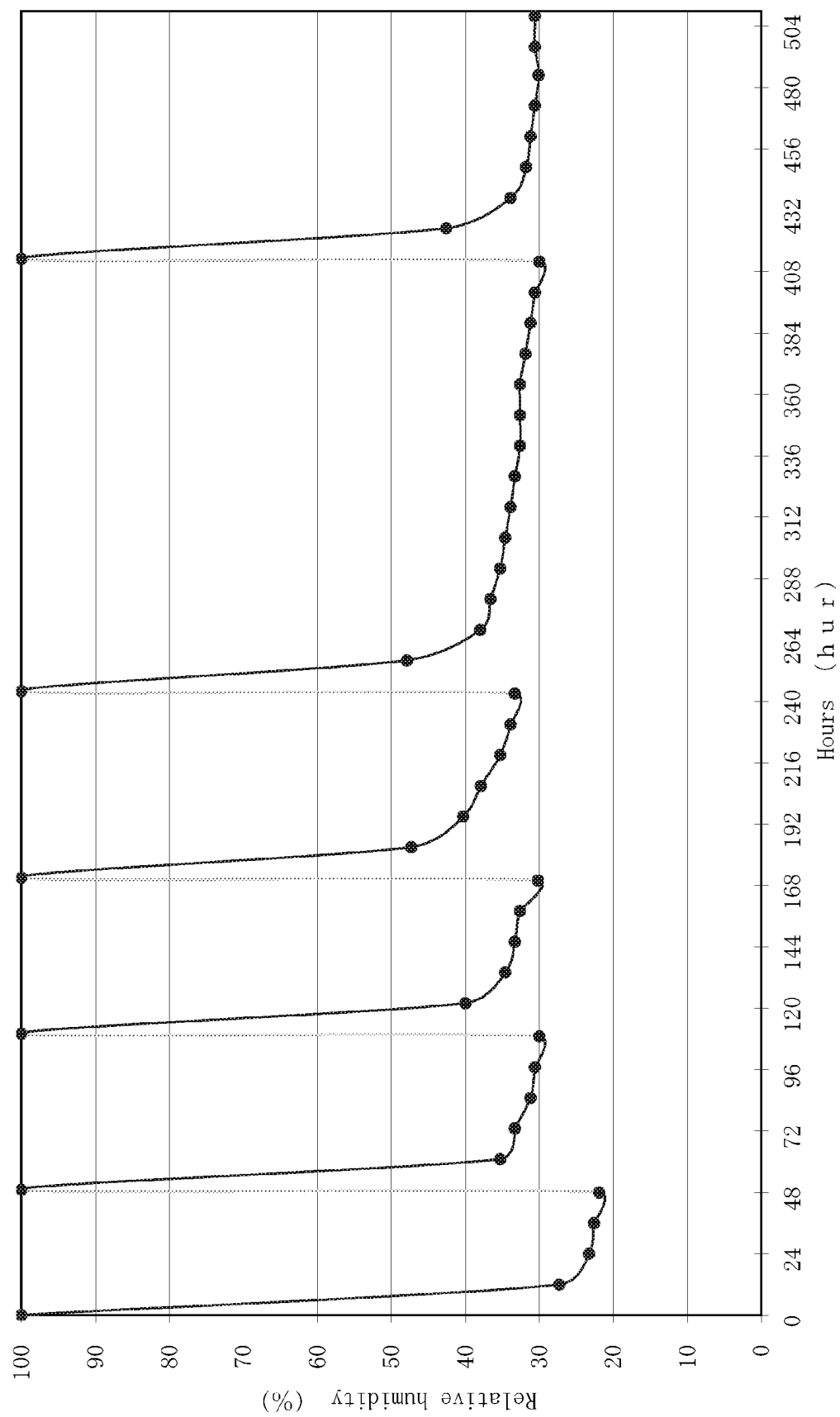
FIG. 6 shows the measurement results of equilibrium humidity according to a Reference example (sample Q)

As clearly shown in FIGS. 5 and 6, the samples P and Q exhibit initially equilibrium humidity of approximately RH 20%, but in the subsequent moisture absorption drops, show repetition up to equilibrium equal to or higher than RH 30%. When the secondary particle size of the magnesium sulfate was 1 to 40 μm, the test samples are expected to stably exhibit equilibrium humidity of approximately 30%, but the above measurement resulted in remarkably unstable equilibrium humidity in each time.

This phenomenon seems to arise because the coarse particles of the magnesium sulfate which exist on a resin surface absorb moisture without being affected by the resin, and first equilibrium humidity falls as a whole. It is thought that, in moisture absorption on and after the second time, the coarse particles already lost moisture absorption capability, and the equilibrium humidity was affected only by the magnesium sulfate particles coated with the resin.

Thus, when magnesium sulfate coarse particles having s secondary particle size exceeding 40 μm are contained, compositions and moldings have two to several steps of equilibrium humidity are manufactured. This situation changes with the content of coarse particles, the thickness of moldings, or the like, and it is difficult to obtain products having stable performance. As a result, it becomes impossible also to impart different equilibrium humidity by a delicate difference of the degree of a specific gravity difference in the resin.

EXAMPLE 5

With 100 parts by weight of ABS (specific gravity 1.05), 50 parts by weight of anhydrous magnesium sulfate whose average primary particle size is 4 to 6 μm were mixed, and then, similar to Example 1, pellets were test-manufactured. The secondary particle size of the magnesium sulfate during dispersion was set to 1 to 40 μm (average 10 to 20 μm).

These pellets were used to manufacture a plate (54 mm×84 mm, 2 mm in thickness) by injection molding as a sample I.

With 100 parts by weight of ABS (specific gravity 1.01), 50 parts by weight of anhydrous magnesium sulfate whose average primary particle size is 4 to 6 μm were mixed, and then, similar to Example 1, pellets were test-manufactured. The secondary particle size of the magnesium sulfate during dispersion was set to 1 to 40 μm (average 10 to 20 μm).

These pellets were used to manufacture a plate (54 mm×84 mm, 2 mm in thickness) by injection molding as a sample J.

The above samples I and J were used as test samples, and two sheets of samples of the same kind were placed in separate glass vessels (volume 0.9 L), respectively. Next, under a constant temperature condition of 25° C., a temperature and humidity sensor was placed in each vessel, and moisture absorption from RH 100% was performed to measure equilibrium humidity. The measurement was performed by returning to a state of RH 100% after reaching the equilibrium humidity, and repeating the moisture absorption. The results are shown in FIG. 7.

Figure 7:
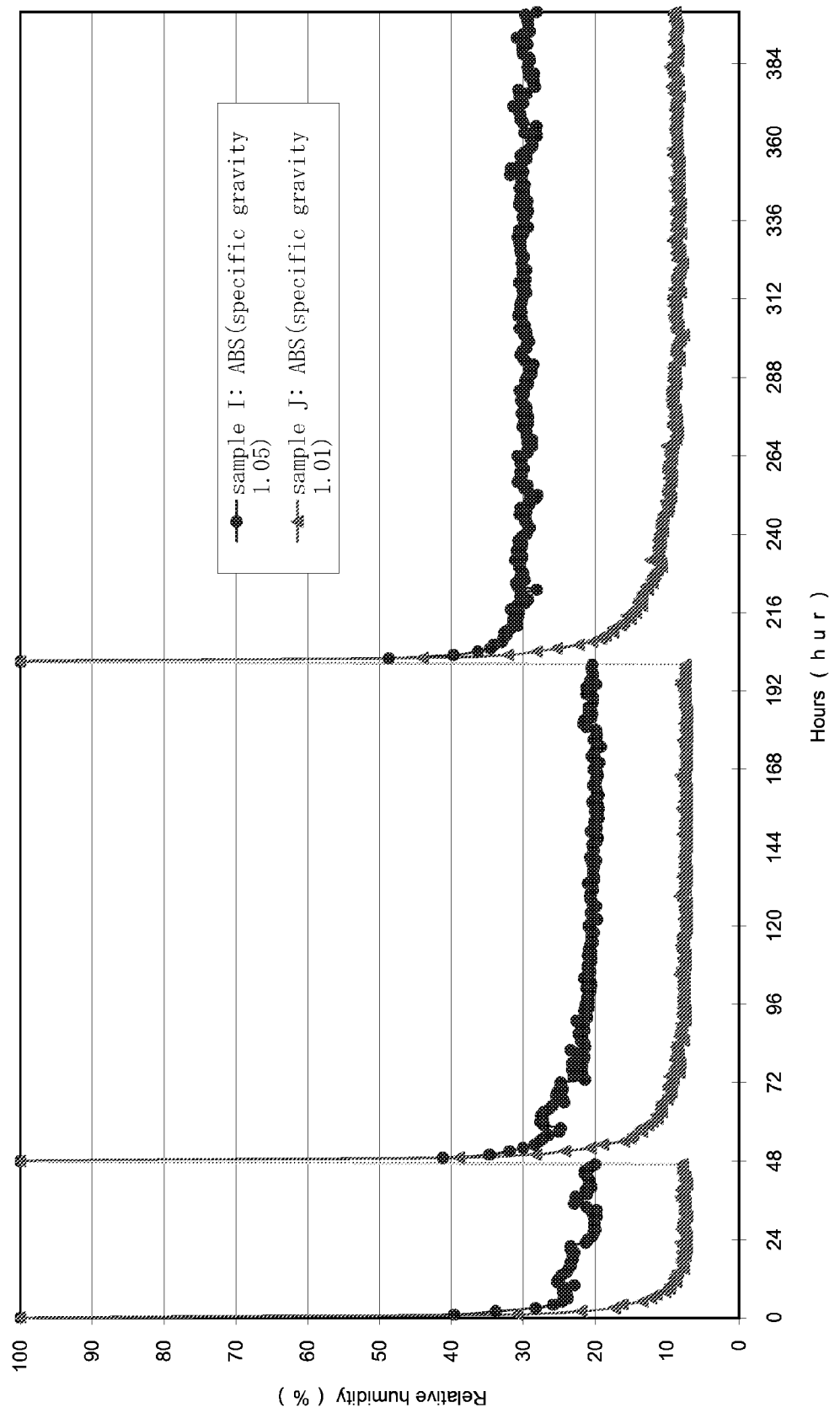
FIG. 7 shows the measurement results of equilibrium humidity according to Example 5.

As clearly shown in FIG. 7, the sample I had the equilibrium humidity of 20 to 21%, and the sample J had the equilibrium humidity of 8 to 9%.

Although, in the sample I, the equilibrium humidity seems to be different by approximately 10% in first, second, and third measurements, this is a phenomenon observed in a sample like this when thickness is large and a surface area is small, and this is because moisture absorption advances from the surface and gradually progresses into the inside of the sample, which progressively delays the time for reaching the equilibrium. That is, the equilibrium humidity did not rise but the fall rate became slow. If data is taken for a more prolonged period of time, the equilibrium humidity will descend to the equilibrium (20 to 21%) comparable to the equilibrium at the first or second time.

Thus, similar to Example 1, the moisture absorbent compositions which exhibit different equilibrium humidity could be obtained by selecting different specific gravity as the specific gravity of ABS into which the magnesium sulfate was kneaded. In the present example, the difference in the equilibrium humidity of 11 to 13% was caused by a difference of 0.04 in the specific gravity of ABS, and ABS having lower specific gravity held the equilibrium at lower humidity.

EXAMPLE 6

In the present example, the samples E and F in the Example 3 were used to perform a test similar to Example 3, and a situation toward the achievement of the equilibrium humidity was observed in an early stage of capability and a stage of capability consumption of 50%. The results are shown in FIG. 8.

Figure 8:
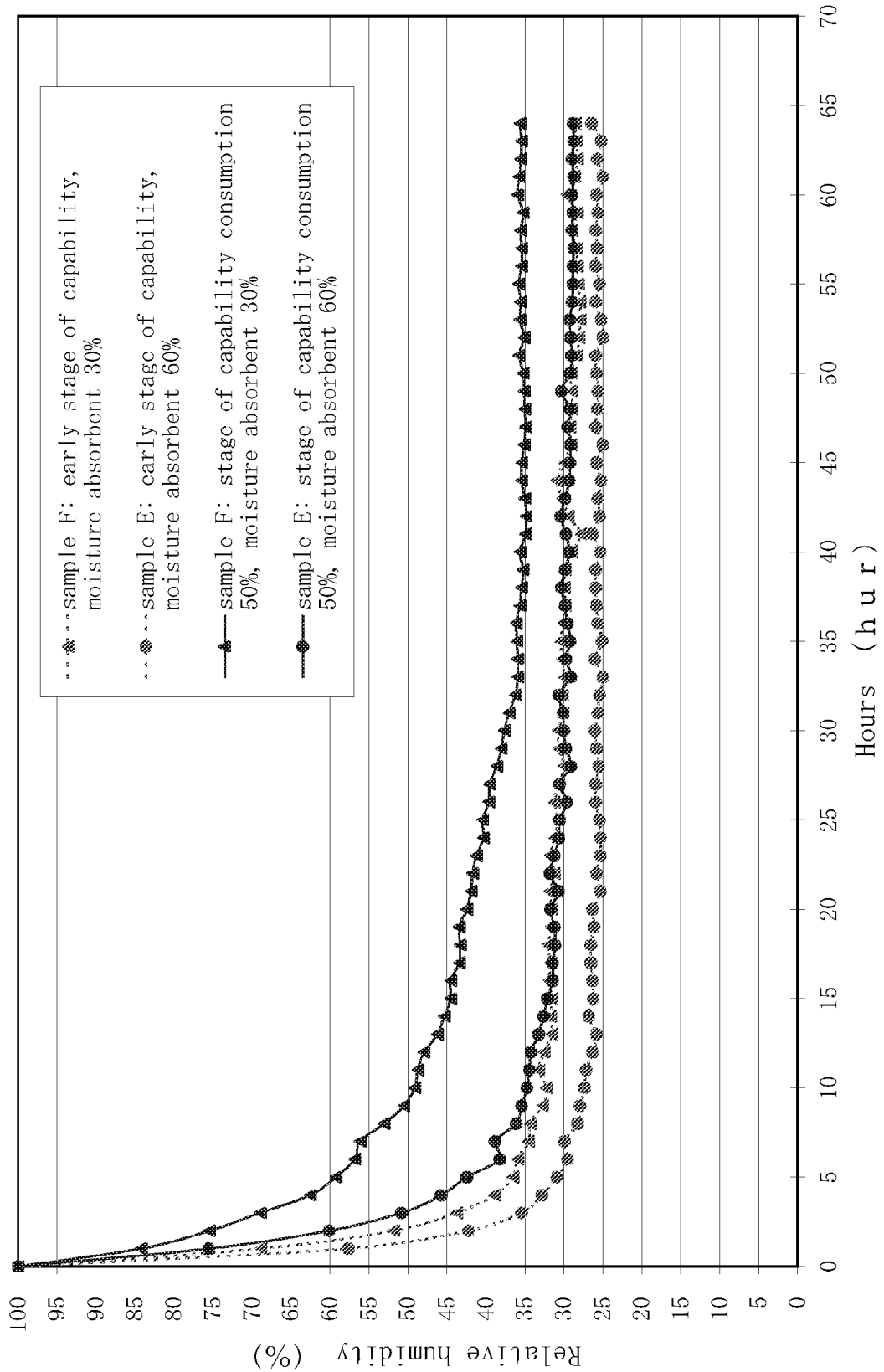
FIG. 8 shows the measurement results of equilibrium humidity according to Example 6.
Figure 9:
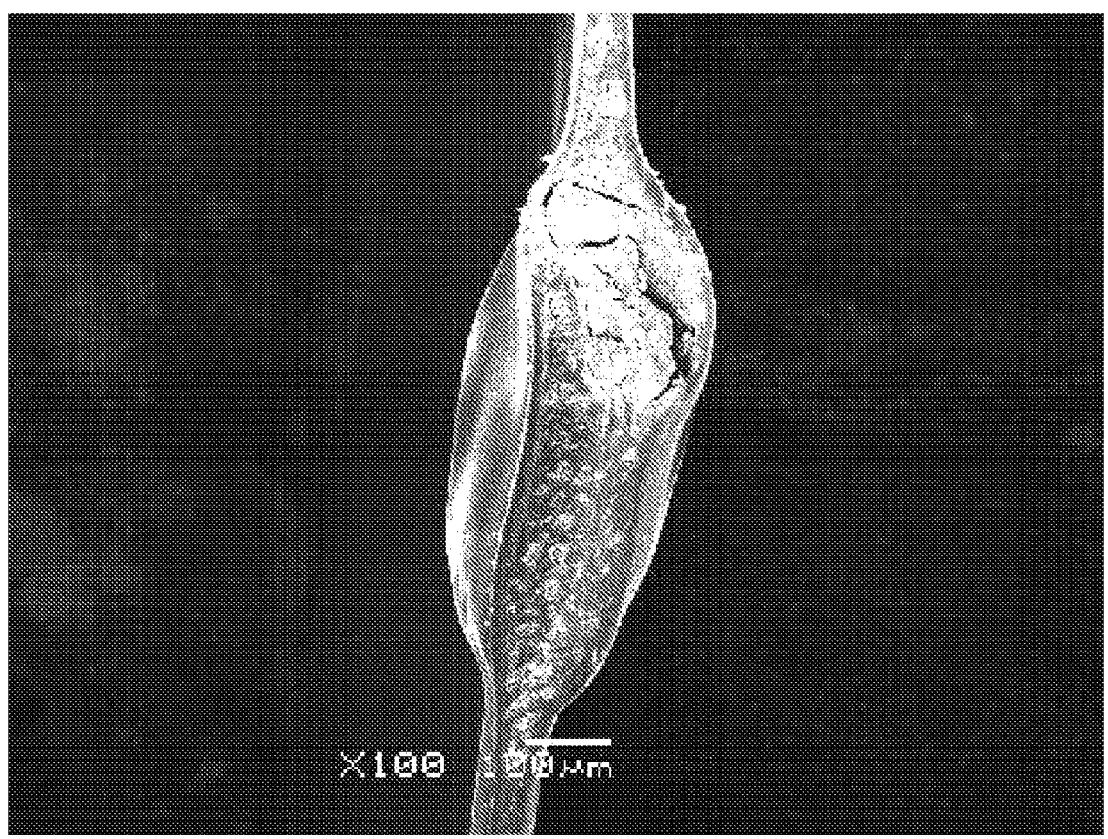
FIG. 9 is an enlarged photograph showing the dispersion state of the moisture absorbent according to Example 7 (specimen "a")
Figure 10:
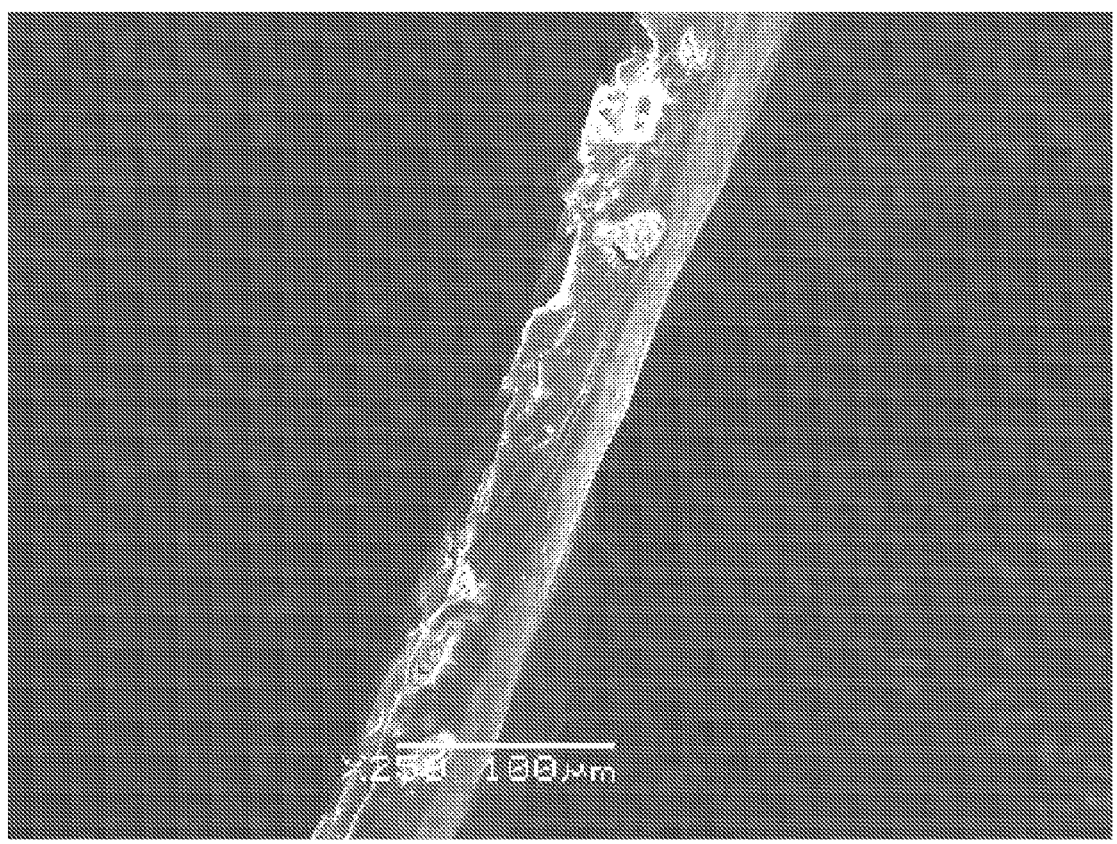
FIG. 10 is an enlarged photograph showing the dispersion state of the moisture absorbent according to Example 7 (specimen "a")
Figure 11:
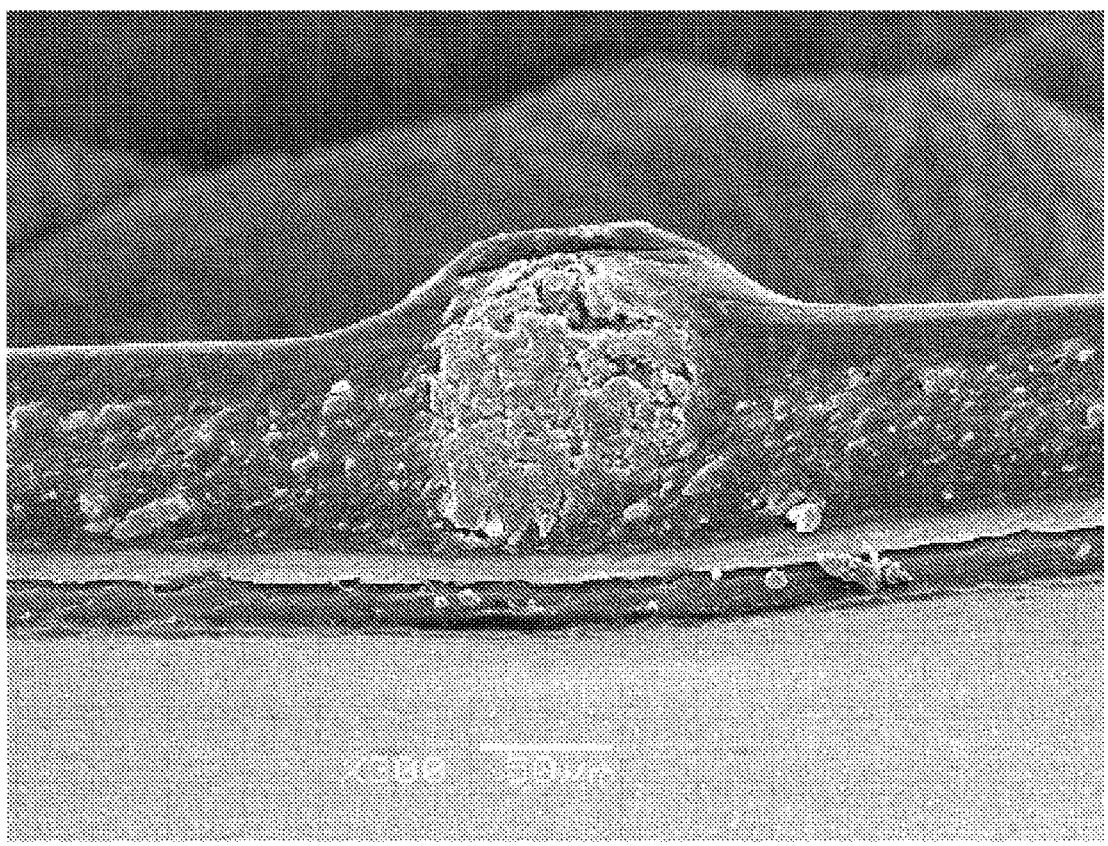
FIG. 11 is an enlarged photograph showing the dispersion state of the moisture absorbent according to Example 7 (specimen "b")
Figure 12:
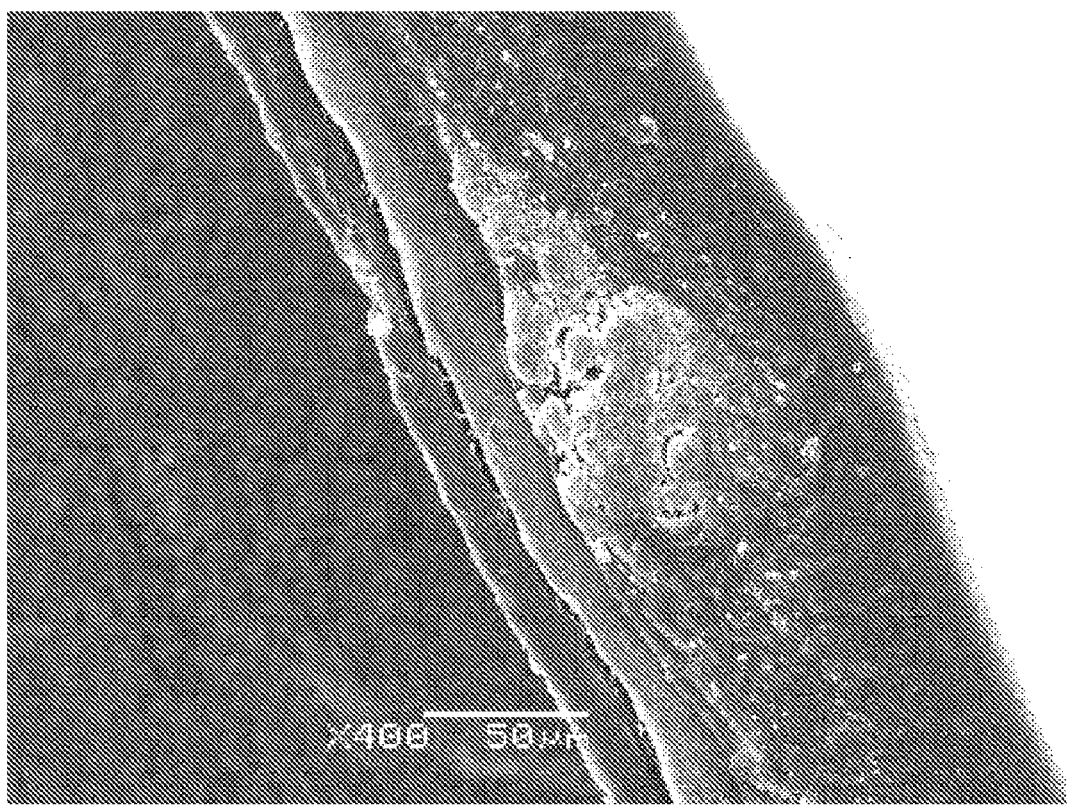
FIG. 12 is an enlarged photograph showing the dispersion state of the moisture absorbent according to Example 7 (specimen "b")
Figure 13:
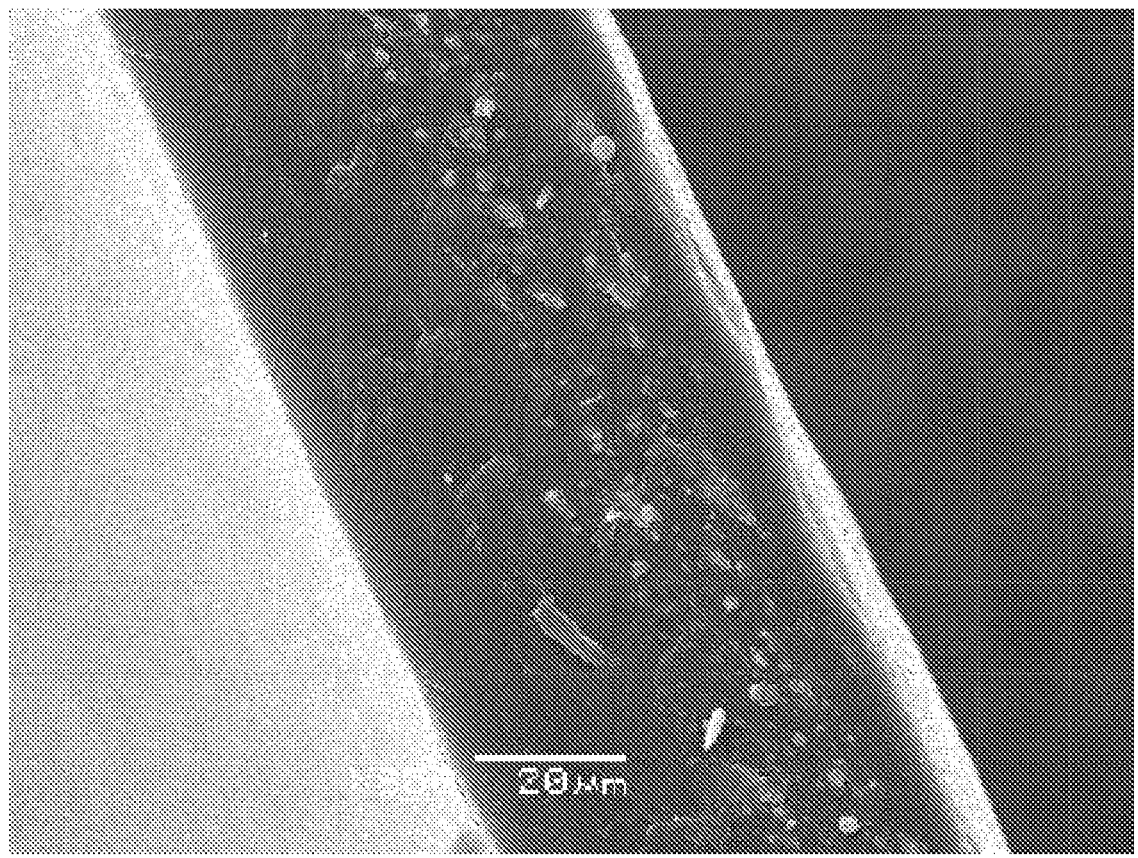
FIG. 13 is an enlarged photograph showing the dispersion state of the moisture absorbent according to Example 7 (specimen "c")
Figure 14:
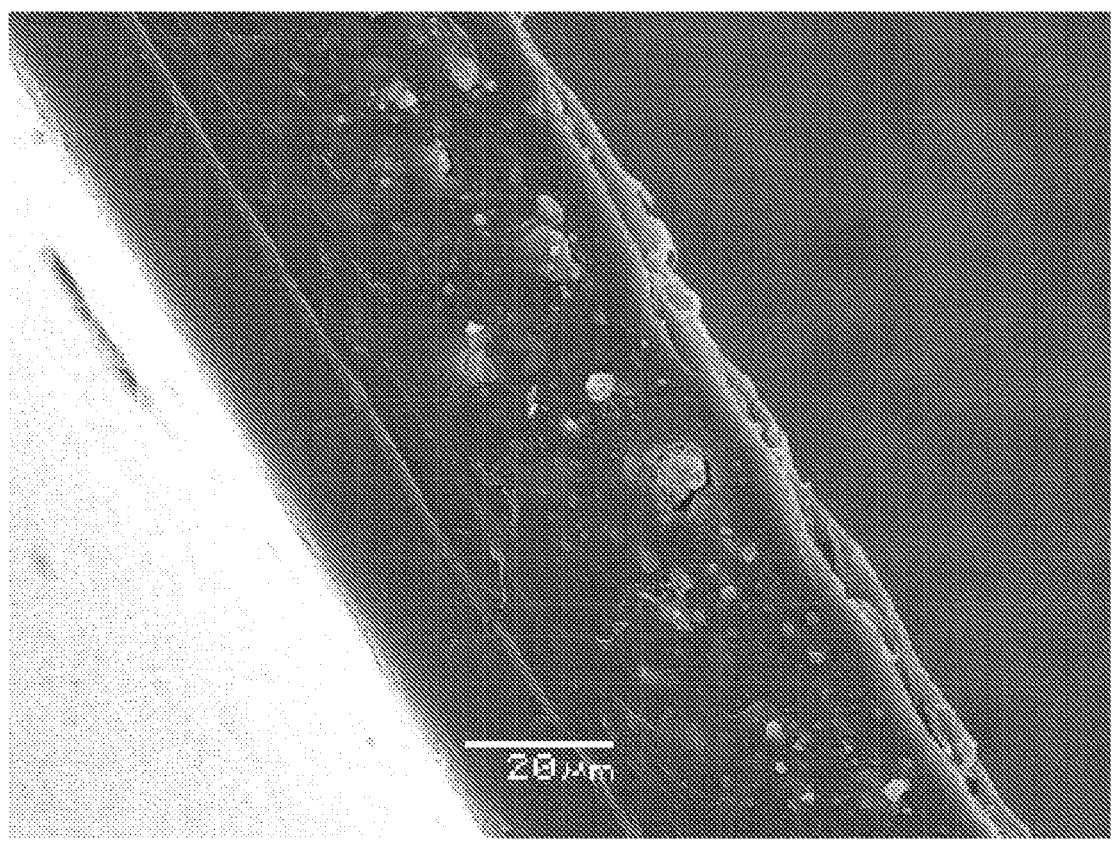
FIG. 14 is an enlarged photograph showing the dispersion state of the moisture absorbent according to Example 7 (specimen "c")
Figure 15:
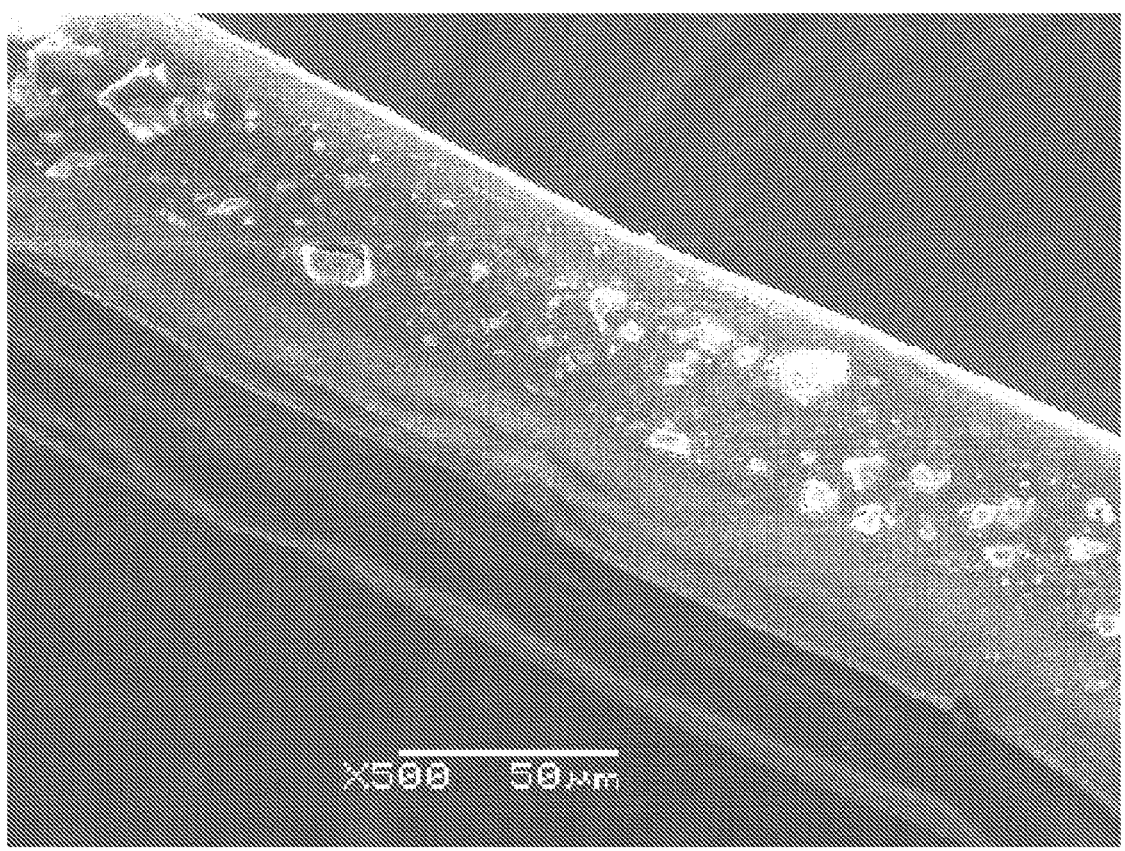
FIG. 15 is an enlarged photograph showing the dispersion state of the moisture absorbent according to Example 7 (specimen "d")
Figure 16:
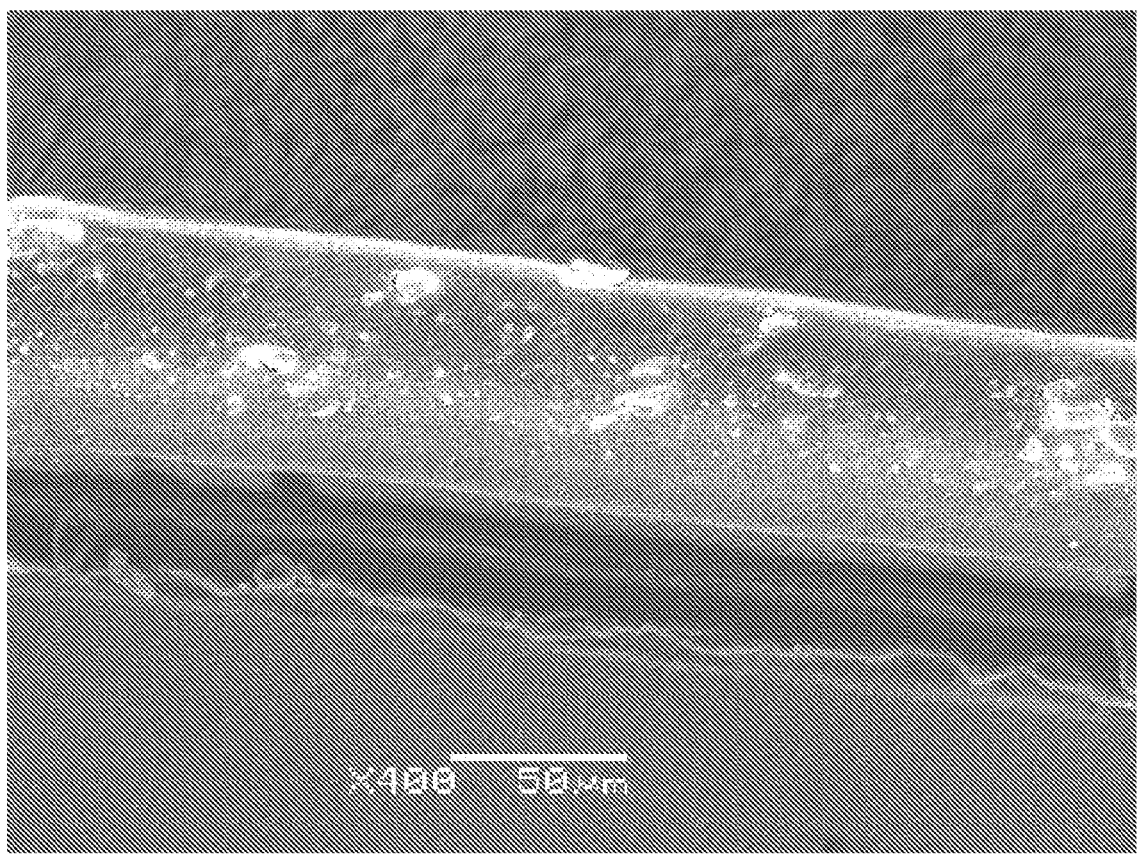
FIG. 16 is an enlarged photograph showing the dispersion state of the moisture absorbent according to Example 7 (specimen "d")
Figure 17:
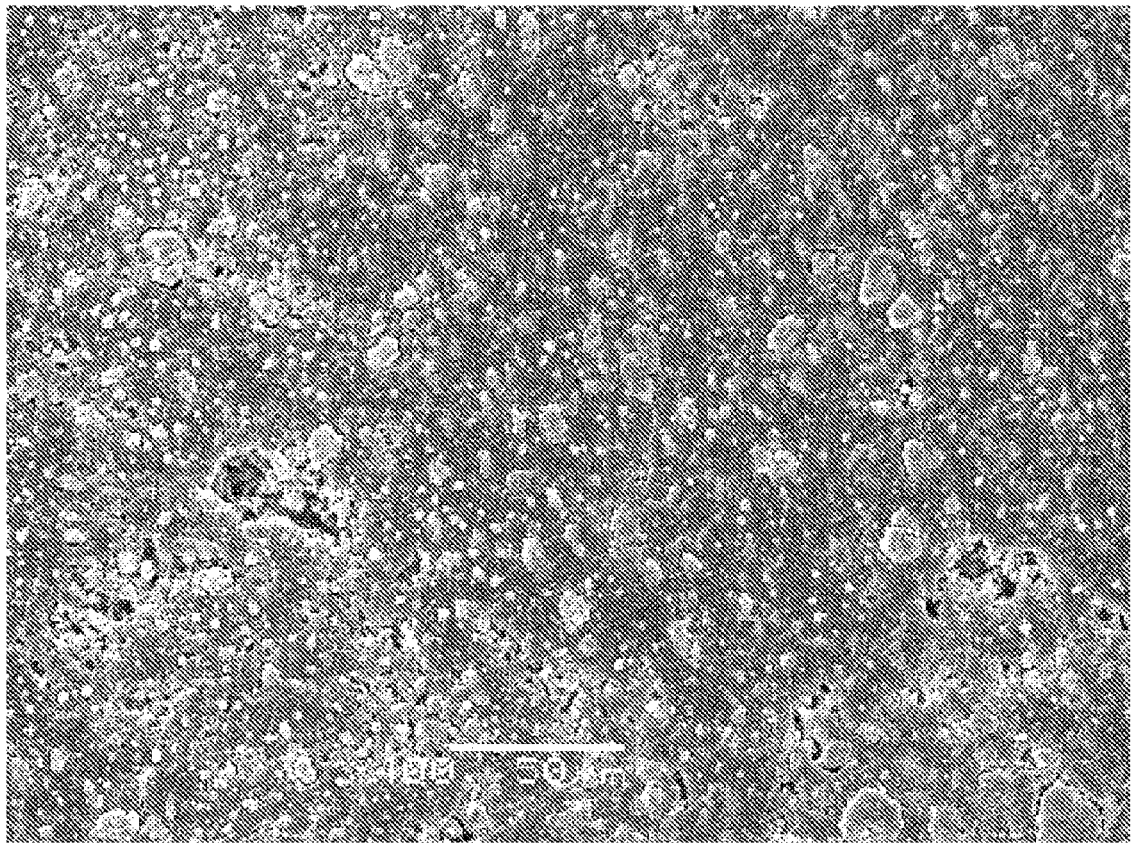
FIG. 17 is an enlarged photograph showing the dispersion state of the moisture absorbent according to Example 7 (specimen "i")
Figure 18:
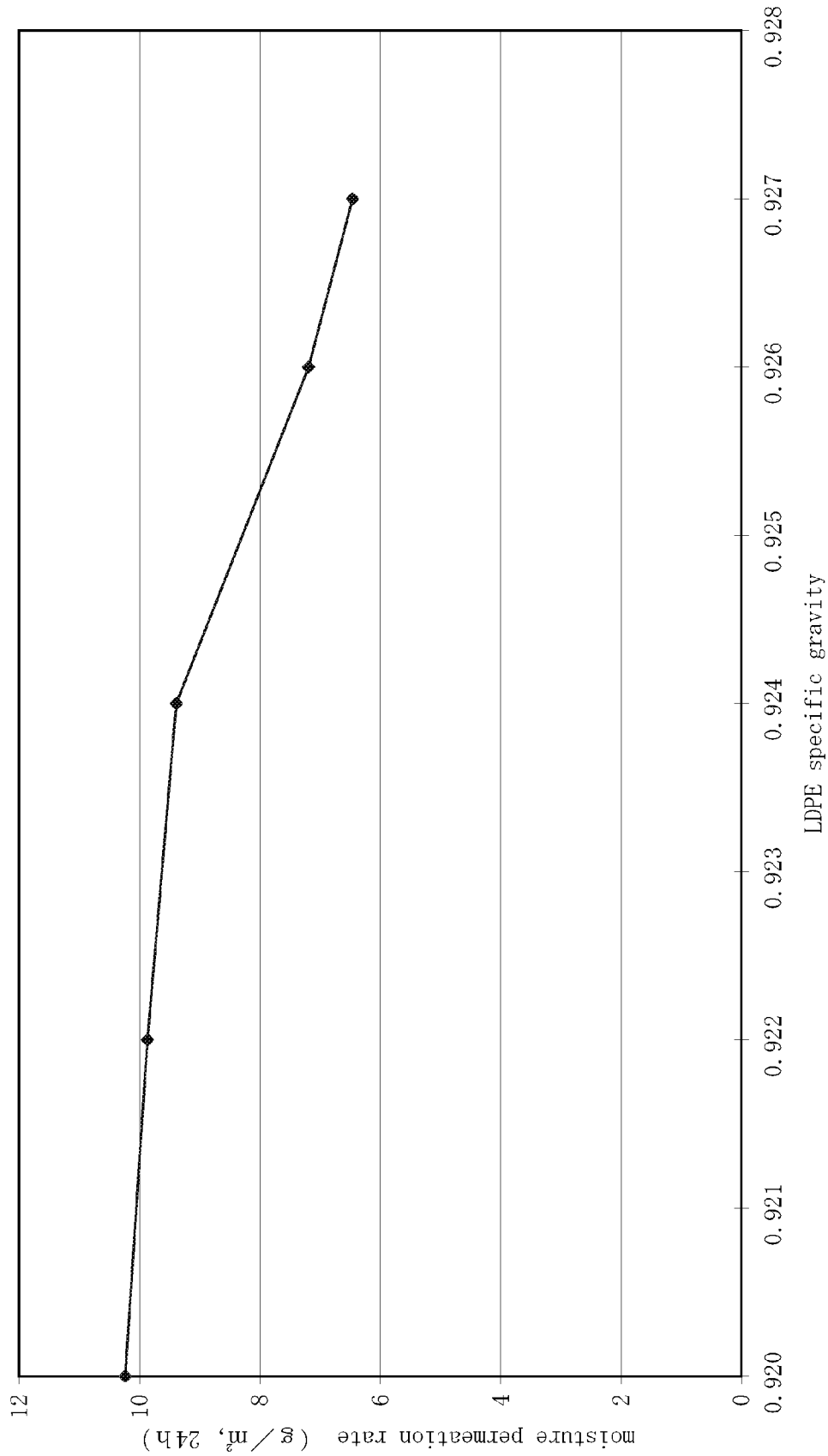
FIG. 18 shows the relationship between the specific gravity of a resin and moisture permeability.

As clearly shown in FIG. 8, the sample E having a higher content of magnesium sulfate (% by weight) reaches the equilibrium humidity in a shorter time than the sample F. Further, in general, the equilibrium humidity has a definite range, and tends to rise as capability consumption advances within the range. However, even if moisture absorption progresses and capability consumption also progresses, the sample E can hold the equilibrium humidity for a long time in a state approximately similar to the early stage.

Thus, even if a capability consumption stage advances by increasing the content of magnesium sulfate as the moisture absorbent, it is possible to suppress an increase in the equilibrium humidity, and hold substantially the same value as the equilibrium humidity at the early stage for a long period of time. Conversely, time for holding the early equilibrium humidity can be shortened by reducing the content of the moisture absorbent.

That is, it became clear that, when the moisture absorbent is in a predetermined dispersion state, the time of maintaining the equilibrium humidity can be controlled by changing the content of the moisture absorbent. This was elicited only after improving the dispersion state of the secondary particles of the moisture absorbent by the present invention.

EXAMPLE 7

In the present example, measurements and analyses were performed by observing, with an electron microscope, the dispersion situation of the moisture absorbent according to the conventional art, and the dispersion situation of the moisture absorbent according to the present invention by using specimens "a" to "j" described later.

Table 3 shows the measurement results and describes the measurement results of the thickness of resins (α) (moisture absorption layer) into which the moisture absorbent is kneaded, the measurement results of the secondary particle size of the moisture absorbents (β), and the ratios thereof (β/α). Further, FIGS. 9 to 17 show representative examples among enlarged photographs showing the dispersion situation of the moisture absorbents in respective specimens.

TABLE 3

| Specimens | Resin thickness (α) | Particle sizes of moisture absorbents (β) | β/α |
|---|---|---|---|
| A | 25 μm | Large: 177 μm<br>Medium: 33 μm<br>Small: 11 μm | 0.44000 to 7.08000 |
| B | 50 μm | Large: 175 μm<br>Medium: 18 μm<br>Small: 3 μm | 0.06000 to 3.50000 |
| C | 30 μm | Large: 12 μm<br>Medium: 5 μm<br>Small: 1 μm | 0.03333 to 0.40000 |
| D | 35 μm | Large: 13 μm<br>Medium: 10 μm<br>Small: 2 μm | 0.05714 to 0.37143 |
| E | 50 μm | Large: 13 μm<br>Medium: 6 μm<br>Small: 2 μm | 0.04000 to 0.26000 |
| F | 42 μm | Large: 7 μm<br>Medium: 5 μm<br>Small: 2 μm | 0.04762 to 0.16667 |
| G | 1.4 mm | Large: 21 μm<br>Medium: 11 μm<br>Small: 5 μm | 0.00357 to 0.01500 |

TABLE 3-continued

| Specimens | Resin thickness (α) | Particle sizes of moisture absorbents (β) | β/α |
|---|---|---|---|
| H | 2.6 mm | Large: 30 μm<br>Medium: 18 μm<br>Small: 5 μm | 0.00192 to 0.01154 |
| I | 1.4 mm | Large: 18 μm<br>Medium: 13 μm<br>Small: 3 μm | 0.00214 to 0.01286 |
| J | 2.2 mm | Large: 25 μm<br>Medium: 13 μm<br>Small: 5 μm | 0.00227 to 0.01136 |

In the above description, the specimens "a" and "b" are manufactured according to the conventional art, and the secondary particle sizes of the moisture absorbents are not controlled into the predetermined size. The specimens "c" to "j" are manufactured according to the present invention, and the secondary particle sizes of the moisture absorbents are controlled into the predetermined size. Respective specimens were formed according to the following conditions. Anhydrous magnesium sulfate was used for all the moisture absorbents, and the thickness of the moisture absorption layers shows design values.

Specimen a
LDPE 20μ/moisture absorption layer 30μ/LDPE 10μ
(Moisture absorption layer: LDPE (specific gravity 0.922) base, content of moisture absorbent (% by weight: hereinafter identical to above) 33%)

Specimen b
PET 12μ//AL 9μ//LDPE 17μ/moisture absorption layer 50μ/LDPE 17μ
(Moisture absorption layer: LDPE (specific gravity 0.920) base, content of moisture absorbent 33%)

Specimen c
LDPE 20μ/moisture absorption layer 30μ/LDPE 10μ
(Moisture absorption layer: LDPE (specific gravity 0.922) base, content of moisture absorbent 33%)

Specimen d
PET 12μ//AL 9μ//LDPE 17μ/moisture absorption layer 50μ/LDPE 17μ
(Moisture absorption layer: LDPE (specific gravity 0.922) base, content of moisture absorbent 33%)

Specimen e
Moisture absorption layer, single layer 50μ
(Moisture absorption layer: LDPE (specific gravity 0.922) base, content of moisture absorbent 33%)

Specimen f
Moisture absorption layer, single layer 60μ (moisture absorption layer: LLDPE (specific gravity 0.909) base, content of moisture absorbent 33%)

Specimen g
Moisture absorption layer, single layer 1.5 mm
(Moisture absorption layer: LLDPE (specific gravity 0.909) base, content of moisture absorbent 33%)

Specimen h
Moisture absorption layer, single layer 2.5 mm
(Moisture absorption layer: LDPE (specific gravity 0.922) base, content of moisture absorbent 33%)

Specimen i
Moisture absorption layer, single layer 1.5 mm
(Moisture absorption layer: ABS (specific gravity 1.05) base, content of moisture absorbent 33%)

Specimen j
Moisture absorption layer, single layer 2.5 mm
(Moisture absorption layer: ABS (specific gravity 1.05) base, content of moisture absorbent 33%)

FIGS. 9 to 17 show that, in the specimens "a" and "b" according to the conventional art, there observed particles of magnesium sulfate breaking through the moisture absorption layers, and exposed to the surfaces. On the other hand, in the specimens "c" to "j" according to the present invention, the particles of magnesium sulfate were included in the moisture absorption layers in all the specimens.

Table 3 clearly shows that, in the specimens "c" to "j" according to the present invention, the particle sizes (secondary particle sizes) of magnesium sulfate are within the range of 1 to 30 μm. The ratio of the particle size (secondary particle size) of magnesium sulfate to the thickness of the resin layer (moisture absorption layer) is 0.4 at a maximum and 0.00192 at a minimum.

However, in the specimens "c" to "j", the kneading and dispersion of magnesium sulfate into the resins are all performed by the same method. Therefore, it is estimated that in fact, also in the specimen "c" having the smallest film thickness of the resins (30 μm), magnesium sulfate having the particle size of approximately 30 μm are dispersed, and similarly, also in the specimen "h" having the largest film thickness of the resins (2.6 mm), magnesium sulfate having the particle size of approximately 1 μm is dispersed. Therefore, in the present example, the ratio, of the resin layer (moisture absorption layer) having the particle size (secondary particle size) of the magnesium sulfate to the film thickness can be estimated to be approximately 1 (=30 μm/30 μm) at the maximum, and approximately 0.00038 (=1 μm/2.6 mm) at the minimum.

The present invention provides an art for easily forming storage environments suitable for increasingly diversified products. That is, in a moisture absorbent composition and a moisture absorbent molding obtained by kneading a moisture absorbent into a thermoplastic resin, different equilibrium humidity attained by selecting the specific gravity of the resin among resins of the same kind. Therefore, the present invention is applicable to various fields of foodstuffs, electronic components, precision machines, or the like, and has the industrial applicability.

It will be obvious to those having skill in the art that many changes may be made in the above-described details of the preferred embodiments of the present invention. The scope of the present invention, therefore, should be determined by the following claims.

What is claimed is:

1. A moisture absorbent composition comprising:
   a thermoplastic resin selected from the group consisting of polyethylene, polypropylene, polyethylene terephthalate, polyvinyl chloride, ABS, polyamide, polystyrene, polyvinyl alcohol, polycarbonate, ethylene-methacrylate copolymer, and polyacetal; and
   a moisture absorbent having an equilibrium vapor pressure, kneaded into the thermoplastic resin, the moisture absorbent comprising of magnesium sulfate represented by the formula $MgSO4 \cdot nH_2O$ ($0 \leq n \leq 3$); wherein
   a surface of the moisture absorbent is coated with a fatty acid metal salt so that the moisture absorbent comes to have a secondary particle size of substantially 1 to 40 μm when dispersed in the thermoplastic resin, in case of that the thermoplastic resin is polyethylene, polypropylene, polyethylene terephthalate, or polyvinyl chloride, equilibrium humidity is raised/lowered by about RH 12% as specific gravity of the thermoplastic resin is increased/decreased by 0.01, and in case of that the thermoplastic resin is ABS, polyamide, polystyrene, polyvinyl alcohol, polycarbonate, ethylene-methacrylate copolymer, or polyacetal, equilibrium humidity is raised/lowered by about RH 3% as specific gravity of the thermoplastic resin is increased/decreased by 0.01.

2. The moisture absorbent composition according to claim 1, wherein the fatty acid metal salt is a metallic soap.

3. A moisture absorbent molding comprising the moisture absorbent composition according to claim 1.

4. A moisture absorbent molding comprising the moisture absorbent composition according to claim 2.

5. A method for controlling equilibrium humidity in a moisture absorbent composition, comprising the steps of:

coating a surface of a moisture absorbent having an equilibrium vapor pressure with a fatty acid metal salt, the moisture absorbent comprising of magnesium sulfate represented by the formula MgSO4.nH$_2$O ($0 \leq n \leq 3$); and kneading the moisture absorbent into a thermoplastic resin so that the moisture absorbent comes to have a secondary particle size of substantially 1 to 40 μm when dispersed in the thermoplastic resin, the thermoplastic resin being selected from the group consisting of polyethylene, polypropylene, polyethylene terephthalate, polyvinyl chloride, ABS, polyamide, polystyrene, polyvinyl alcohol, polycarbonate, ethylene-methacrylate copolymer, and polyacetal; whereby in case of that the thermoplastic resin is polyethylene, polypropylene, polyethylene terephthalate, or polyvinyl chloride, equilibrium humidity is raised/lowered by about RH 12% as specific gravity of the thermoplastic resin is increased/decreased by 0.01, and in case of that the thermoplastic resin is ABS, polyamide, polystyrene, polyvinyl alcohol, polycarbonate, ethylene-methacrylate copolymer, or polyacetal, equilibrium humidity is raised/lowered by about RH 3% as specific gravity of the thermoplastic resin is increased/decreased by 0.01.

6. A method for controlling a time of maintaining equilibrium humidity in a moisture absorbent composition, comprising the steps of:

coating a surface of a moisture absorbent having an equilibrium vapor pressure with a fatty acid metal salt, the moisture absorbent comprising magnesium sulfate represented by the formula $MgSO_4 \cdot nH_2O$ ($0 \leq n \leq 3$); and kneading the moisture absorbent into a thermoplastic resin so that the moisture absorbent comes to have a secondary particle size of substantially 1 to 40 μm when dispersed in the thermoplastic resin, the thermoplastic resin being selected from the group consisting of polyethylene, polypropylene, polyethylene terephthalate, polyvinyl chloride, ABS, polyamide, polystyrene, polyvinyl alcohol, polycarbonate, ethylene-methacrylate copolymer, and polyacetal; whereby a time of maintaining equilibrium humidity is prolonged with an increase in content (% by weight) of the moisture absorbent to the thermoplastic resin.

* * * * *